(12) United States Patent (10) Patent No.: US 12,520,062 B2
Cowley et al. (45) Date of Patent: Jan. 6, 2026

(54) APPROACH TO DEINTERLEAVE PARALLEL ROW READS IN IMAGE SENSORS

(71) Applicant: SEMICONDUCTOR COMPONENTS INDUSTRIES, LLC, Scottsdale, AZ (US)

(72) Inventors: Nicholas Paul Cowley, Wroughton (GB); Matthew Stephen Bentley, Swindon (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 72 days.

(21) Appl. No.: 18/751,676

(22) Filed: Jun. 24, 2024

(65) Prior Publication Data
US 2025/0392841 A1 Dec. 25, 2025

(51) Int. Cl.
*H04N 25/767* (2023.01)
*H04N 25/771* (2023.01)
*H04N 25/78* (2023.01)

(52) U.S. Cl.
CPC ......... *H04N 25/767* (2023.01); *H04N 25/771* (2023.01); *H04N 25/78* (2023.01)

(58) Field of Classification Search
CPC ..... H04N 25/767; H04N 25/771; H04N 25/78
See application file for complete search history.

(56) References Cited

U.S. PATENT DOCUMENTS

| 7,488,928 B2 | 2/2009 | Krymski |
| 8,570,416 B2 * | 10/2013 | Araki ................... H04N 25/767 |
| | | 257/292 |
| 8,659,692 B2 | 2/2014 | Matsuda et al. |

(Continued)

OTHER PUBLICATIONS

Chou, Po-Sheng , et al., "A 1.1μm-Pitch 13.5Mpixel 3D-Stacked CMOS Image Sensor Featuring 230fps Full-High-Definition and 514fps High-Definition Videos by Reading 2 or 3 Rows Simultaneously Using a col. Switching Matrix", 2018 IEEE International Solid-State Circuits Conference, pp. 88-90.

(Continued)

*Primary Examiner* — Nicholas G Giles
(74) *Attorney, Agent, or Firm* — Botos Churchill IP Law LLP

(57) ABSTRACT

The technology involves imaging devices, such as image sensors and imaging systems, providing methods of performing parallel readout of two or more rows of image pixels of such devices. This includes a deinterleaving approach that exploits both row read interleaving and memory deinterleaving in order to reduce the memory requirement to convert the row read parallelism to a serialized row stream. Parallel readout can be applied to non-contiguous rows of pixels, including when subsampling or when two contiguous rows share floating diffusion. The process may include parallel row read deinterleaving of a stored image by performing time division multiplexing partial deinterleaving of selected rows when reading selected rows in parallel from a pixel array to order even rows of the selected rows sequentially and odd rows of the selected rows sequentially. A memory store can time-shift either the even or odd rows of the partially deinterleaved selected rows.

20 Claims, 16 Drawing Sheets

(56) References Cited

U.S. PATENT DOCUMENTS

| | | |
|---|---|---|
| 11,146,753 B2* | 10/2021 | Shimura ................. H04N 25/69 |
| 2010/0283881 A1* | 11/2010 | Araki ..................... H04N 25/70 |
| | | 348/308 |
| 2018/0336667 A1 | 11/2018 | Clark et al. |
| 2021/0006740 A1* | 1/2021 | Shimura .............. H04N 25/671 |
| 2021/0051283 A1 | 2/2021 | Cowley et al. |
| 2021/0243397 A1 | 8/2021 | Cowley et al. |
| 2021/0281787 A1 | 9/2021 | Cowley et al. |
| 2022/0286634 A1 | 9/2022 | Cowley et al. |

OTHER PUBLICATIONS

Rotte, Jeroen, et al., "A 2.5um 9.5Mpixel charge domain global shutter imager with dual cols. and 7.1Gbps per channel outputs for high framerate applications", ResearchGate, 2021, 4 pgs.

* cited by examiner

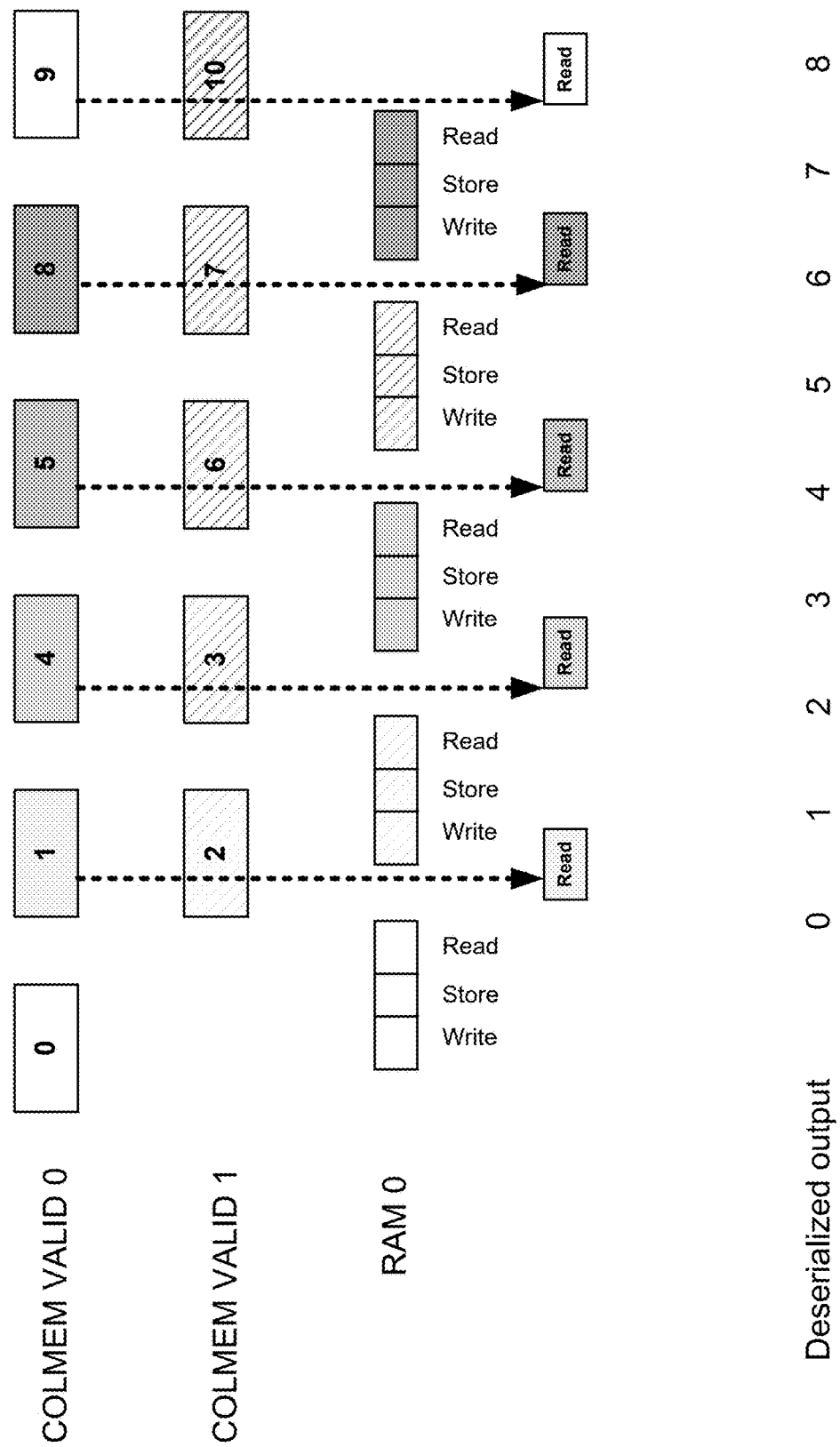

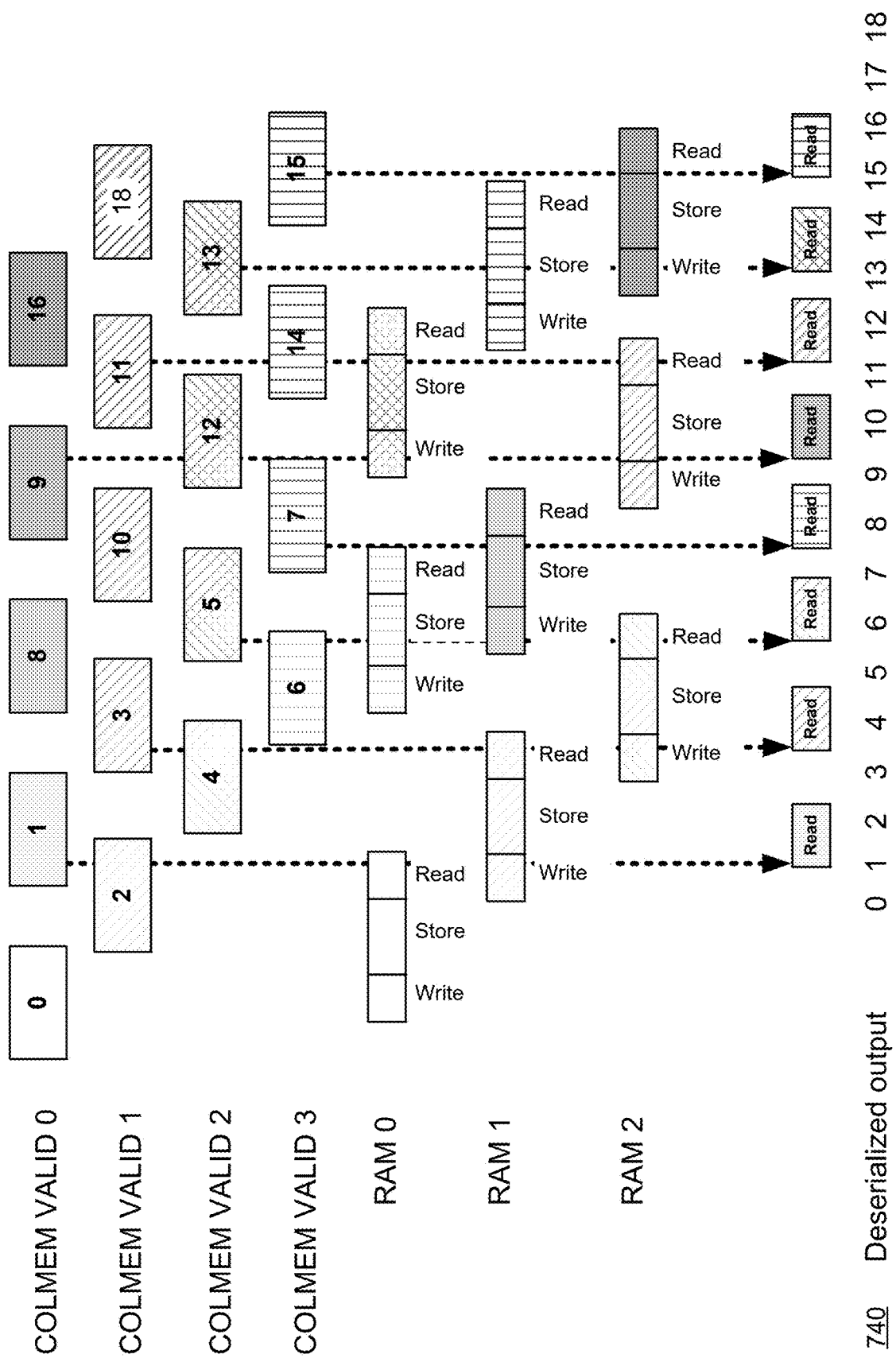

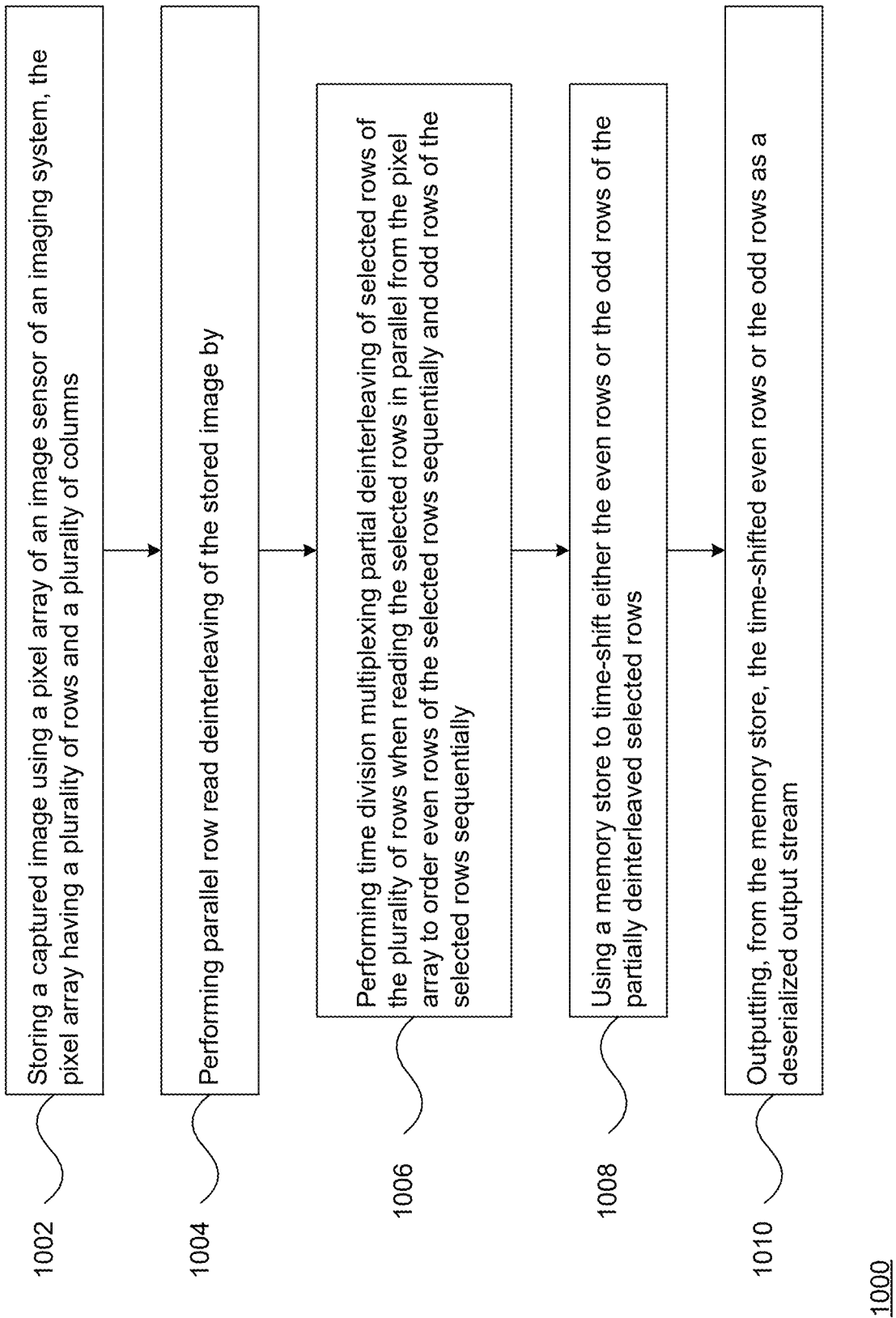

APPROACH TO DEINTERLEAVE PARALLEL ROW READS IN IMAGE SENSORS

BACKGROUND

Image sensors and imaging systems are used in a wide variety of electronic devices to capture imagery for many different situations and applications. In a typical arrangement, an image sensor has an array of image pixels arranged in rows and columns. Readout circuitry can be coupled to a corresponding column for reading out image signals from each of the image pixels in that corresponding column.

Large image pixel arrays may be particularly suitable for situations where high-resolution imagery is needed. However, issues can arise when trying to perform readout operations. For instance, there may be hundreds or thousands of rows and columns in the array. The frame rate for pixel readout is proportional to the time it takes to read out all of the rows in the array. For instance, doubling the number of rows would halve the frame rate if all other factors remain constant. A faster readout by the imaging system may necessitate higher power consumption by the imaging system.

In some approaches, the frame rate may be increased by reading out multiple rows in parallel. For instance, this could be implemented by dividing the array into two or more segments and associating each segment with unique column (or row) read paths. Data can then be read in parallel from these unique segments and reconstructed using a dedicated frame memory. However, as this approach uses the frame memory to reconstruct a complete image, that dedicated component may not be a suitable solution from a hardware, processing or cost perspective. In other approaches, multiple adjacent rows can be read out in parallel. However, such approaches may require one or more additional row buffers between the array read and data processing blocks to deinterleave the parallel streams. This requirement may be inefficient or otherwise unsuitable in certain implementations.

BRIEF SUMMARY

The technology relates to image sensors, imaging systems, and approaches for effectively performing parallel readout of two or more rows of image pixels. The approaches involve deinterleaving in a manner that exploits both row read interleaving and memory deinterleaving to significantly reduce the memory requirement to convert the row read parallelism to a serialized row stream. The parallel readout can be applied to two or more non-contiguous rows of pixels, including when subsampling or when two contiguous rows share a floating diffusion region.

As discussed further below, rows are read out in a time division multiplexing manner, where each row can be read out with a delay equal to twice the deinterleaved row time divided by the number of rows being read in parallel. Moreover, when reading out N rows in parallel, this approach is achieved using only N−1 memory rows (e.g., RAM or other local storage) to deserialize the interleaved rows.

According to one aspect of the technology, a method comprises: storing a captured image using a pixel array of an image sensor of an imaging system, the pixel array having a plurality of rows and a plurality of columns; performing parallel row read deinterleaving of the stored image by: performing time division multiplexing partial deinterleaving of selected rows of the plurality of rows when reading the selected rows in parallel from the pixel array to order even rows of the selected rows sequentially and odd rows of the selected rows sequentially; and using a memory store to time-shift either the even rows or the odd rows of the partially deinterleaved selected rows; and outputting, from the memory store, the time-shifted even rows or the odd rows as a deserialized output stream.

In one example, the time division multiplexing partial deinterleaving causes each row to be read with a time delay (Ta) corresponding to twice a deinterleaved row time divided by a number of rows being read in parallel. The memory store may employ N−1 memory rows to perform the deinterleaving to time shift the partially deinterleaved selected rows, where N is a number of rows read in parallel. Sequencing of the time division multiplexing may be performed using a sequencer of the image sensor. In this case, the method may further comprise controlling transfer of the even rows or the odd rows of the partially deinterleaved selected rows into the memory store via the sequencer. Here, the sequencer may employ a calculated sequence for each clock cycle. Alternatively, the sequencer may employ a lookup table for each clock cycle. In one scenario, pairs of pixels of adjacent rows in the pixel array share a common floating diffusion region.

The method may further comprise performing subsampling during the reading the selected rows in parallel to achieve monochromatic subsampling for the deserialized output. Alternatively, the method may further comprise performing subsampling during the reading the selected rows in parallel to achieve Bayer subsampling for the deserialized output stream. Moreover, for any of the configurations discussed above, the deserialized output stream may be output to an image processor of the imaging system.

According to another aspect, an image sensor comprises a pixel array configured to store a captured image. The pixel array has a plurality of rows and a plurality of columns and readout circuitry configured to perform readout of charges for at least some pixels in the pixel array. The readout circuitry includes a plurality of column memories. The image sensor also includes a memory store operatively connected to the plurality of column memories. The image sensor is configured to perform parallel row read deinterleaving of the stored image by: performance of reading out selected rows of the plurality of rows in parallel from the pixel array to the plurality of column memories with a time delay; and performance of passing a subset of the selected rows to the memory store to time-shift the subset of the selected rows. The image sensor also includes an interface configured to output an output stream from the plurality of column memories and the memory store, the output stream including rows from the selected rows and the time shifted rows.

The memory store may employ N−1 memory rows for performance of the time shift of the subset of the selected rows, where N is a number of rows read in parallel. The image sensor may further comprise a sequencer configured to sequence the reading out of the selected rows. In this case, the sequencer may be further configured to control the passing of the subset of the selected rows from the plurality of column memories into the memory store.

The image sensor may be further configured to perform subsampling during the reading out of the selected rows. Pairs of pixels of adjacent rows in the pixel array may share a common floating diffusion region.

According to a further aspect, an imaging system comprises a pixel array, readout circuitry, a memory store, and an interface. The pixel array is configured to store a captured image. The pixel array has a plurality of rows and a plurality of columns. The readout circuitry is configured to perform readout of charges for at least some pixels in the pixel array. The readout circuitry includes a plurality of column memories configured to read out selected rows of the plurality of rows with a time delay. The memory store is operatively connected to the plurality of column memories. The memory store is configured to time-shift a subset of the selected rows. And the interface is configured to output an output stream from the plurality of column memories and the memory store. The output stream includes rows from the selected rows and the time shifted rows.

In one example, the imaging system further comprises an image processor having a frame store. In this case, the memory store is distinct from the frame store of the image processor, and the frame store is configured to receive the output stream from the memory store via the interface. This example may further comprise a sequencer configured to trigger the readout of selected ones of the plurality of rows with the time delay, and a transfer of the subset of the selected rows from the plurality of column memories to the memory store.

BRIEF DESCRIPTION OF THE DRAWINGS

FIGS. 7A-7C illustrate parallel row read examples in accordance with aspects of the technology.

FIG. 10 illustrates an example method in accordance with aspects of the technology.

DETAILED DESCRIPTION

As noted above, aspects of the technology focus on parallel readout for multiple rows of a pixel array. In particular, parallel readout can be performed for two or more contiguous or non-contiguous rows of pixels. This can be done when subsampling or for shared pixel configurations, where pixels in two or more contiguous rows share a floating diffusion region.

For instance, assuming a shared pixel configuration having a 1×2 pixel kernel, in which there are two vertically associated odd and even row pixels that share a common floating diffusion, it is desirable to read row N and N+2 in parallel to minimize row memory. In other words, two (or more) near-adjacent rows would be read in parallel rather than reading two immediately adjacent rows in parallel. Systems and methods are provided for deinterleaving in a way that exploits both row read interleaving and memory deinterleaving. This can significantly reduce the memory requirement to convert the row read parallelism to a serialized row stream. This approach can also provide an increase in the deinterleaved row rate when subsampling.

The following discussion addresses both general image sensing arrangements as well as deinterleaving of parallel row reads in according with the technology.

Example Imaging System

Figure 1:
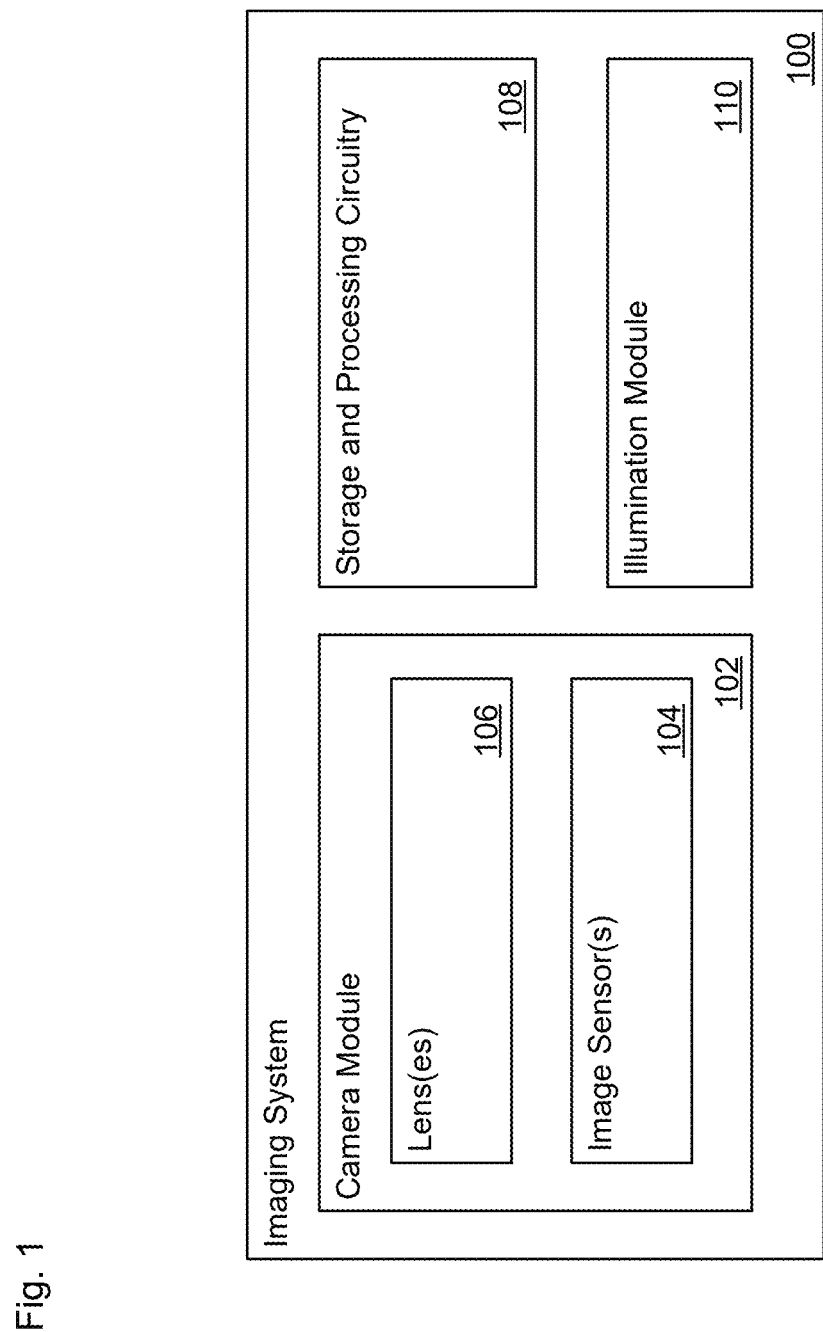
FIG. 1 illustrates an exemplary imaging system in accordance with aspects of the technology.

FIG. 1 is a block diagram of an exemplary imaging system 100, such as an electronic device that employs sensor circuitry (also referred to as a sensor module) to capture imagery. Imaging system 100 may comprise or be part of a still or video camera, a webcam, a mobile phone, a laptop or tablet computer, a video surveillance system, a high speed inspection system, a vehicle imaging system, a video game system with imaging capabilities, an augmented reality (AR) and/or virtual reality (VR) system, an unmanned aerial vehicle system (such as a drone), a commercial or industrial system, etc. Camera (or imaging) module 102 is configured to convert incoming/received light into digital image data. Camera module 102 includes one or more image sensors (or sensor modules) 104.

During an image capture process, light from a scene is focused onto the image sensor(s) 104 by one or more corresponding lenses 106. Image sensors 104 may include circuitry for generating analog pixel image signals and circuitry for converting those image signals into corresponding digital image data. The digital image data may be provided to storage and processing circuitry 108.

Storage and processing circuitry 108 may include, e.g., one or more integrated circuits (ICs), such as image processing circuits, microprocessors, storage devices such as random-access memory (RAM) and/or non-volatile memory (NVM), etc. This circuitry may be implemented using components that are separate from camera module 102 or that may form part of camera module 102. When storage and processing circuitry 108 is implemented on different ICs than those implementing camera module 102, the ICs with circuitry 108 may be stacked or otherwise packaged with the ICs for camera module 102.

Image data that has been captured by camera module 102 may be processed and stored using processing circuitry 108 (e.g., using an image processing engine of processing circuitry 108, using an imaging mode selection engine on processing circuitry 108, etc.). Processed image data may be provided to external equipment such as a computer, a vehicle control system, an external display, or other devices using a wired or wireless communications path coupled to processing circuitry 108 (not shown).

In the example of FIG. 1, camera module 102 can include illumination module 110, which is configured to emit light for illuminating objects in an image scene. Image sensor(s) 104 may be configured to gather reflected versions of the emitted light and to generate image information for the scene. By way of example only, such image information may include depth or distance information for one or more objects, a depth or distance map of the image scene, an image of the image scene, etc.

Illumination module 110, such as a light emitter controlled by the driver circuitry, may emit light having any suitable characteristic(s). This can include any suitable waveform, peak amplitude or power, periodicity or frequency, pulses of light, light with a modulated amplitude and a modulation frequency, etc. The emitted light may be in the infrared (IR) and/or optical bands, and may be generated by an LED or a laser configured to emit one or more light pulses, such as in a light pulse train. The emitted light may reach one or more objects in an image scene and reflect off of such objects, returning to the camera module 102 as reflected light. Objects 13 may include any suitable objects, whether fixed or mobile. By way of example only, in a driving scene for a vehicle operating in an autonomous (or manual) driving mode, objects may include signage, street light, driving or bike lanes, curbs or sidewalks, other road users (e.g., other vehicles, bicyclists or pedestrians), trees or shrubbery, etc.

Reflected light may be received at the image sensor 104 (e.g., at one or more active image pixels, at one or more photosensitive elements in the active image pixels, etc.). Driver circuitry and/or control circuitry may control the pixels to generate one or more image frames based on the reflected light, such as by providing control signals coupled to transistors or other actuated elements (e.g., switching elements) in the pixels. In particular, based on the received control signals from the driver circuitry and/or control circuitry, the pixels may generate different portions of charge in response to reflected light (e.g., during an integration or exposure time period), may perform one or more readout operations on the generated portions of charge (e.g., during a readout time period), or may perform other operations during other time periods.

Processing circuitry in camera module 102 or processing circuitry in the imaging system 100) may control illumination module 110 (if employed) and know the characteristics of the emitted light signal. The processing circuitry may control the image sensor(s) 104 to generate image signals for one or multiple image frames, which are indicative of the characteristics of the reflected light signal. The system may process (e.g., compare and correlate) the generated image signals for these image frames to the reflected light and to emitted light to determine a phase difference and/or time of flight information.

Example Scenario

Figure 2:
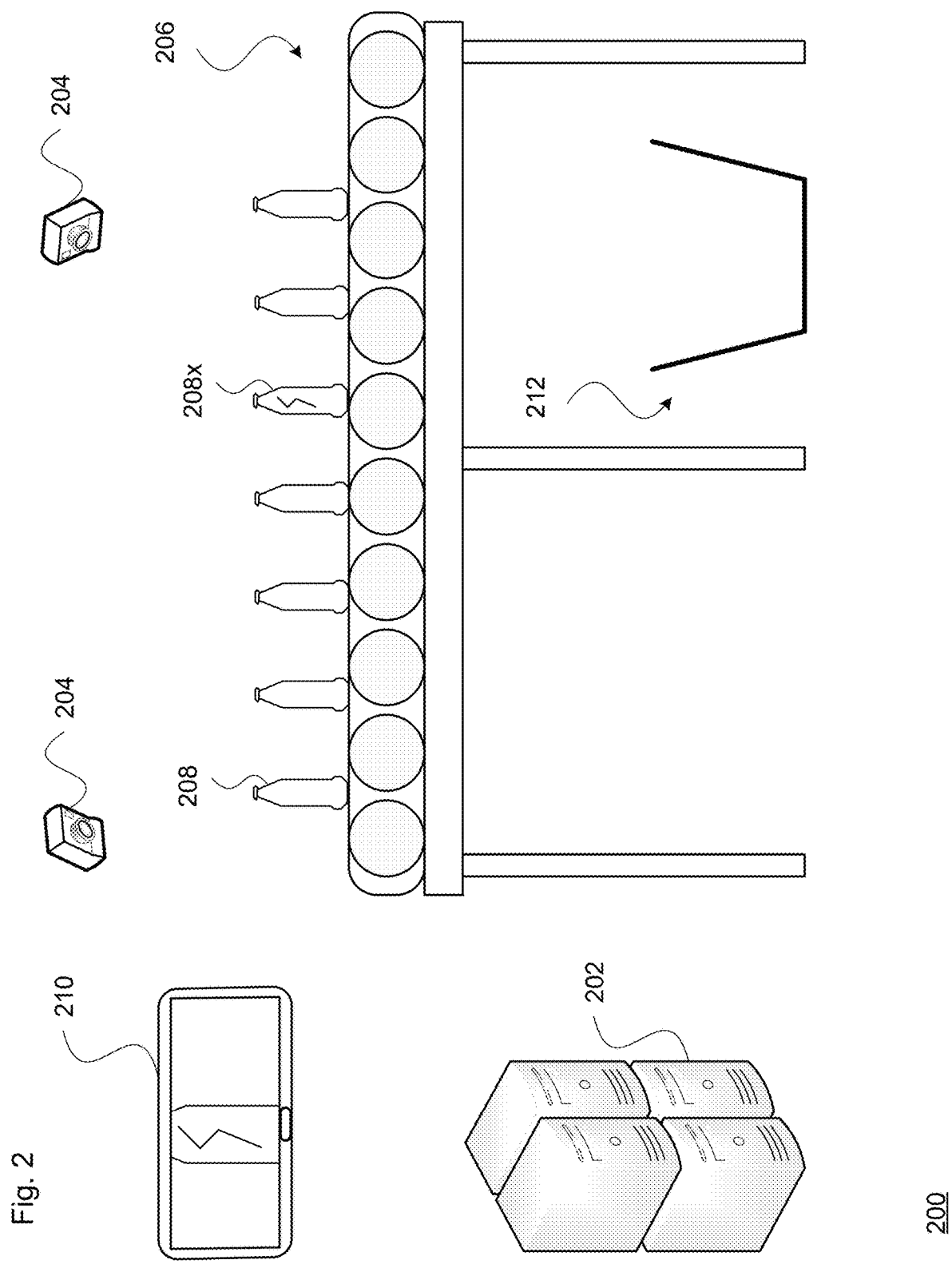
FIG. 2 illustrates an example scenario in accordance with aspects of the technology.

FIG. 2 illustrates an exemplary image sensing scenario 200, where a set of image sensors are part of an automated inspection system. In particular, the inspection system in this example includes a processing system 202 operatively coupled to image sensors 204. The image sensors 204 are configured to obtain imagery along an inspection line 206 (e.g., an assembly line) or other inspection setup. As shown here, a number of items, such as bottles 208, move along the inspection line 206. A display 210 may present imagery captured by the image sensors 204. One of the items, in particular bottle 208x, is shown to have a crack or other defect, as displayed on display 210. As part of an automated inspection process, this defective item may be discarded into bin 212. In other situations, any defective items may be flagged or otherwise identified for further testing or repair.

In this image sensing scenario 200, a very high image resolution, e.g., on the order of 1 to 10 megapixels or more, may be needed for inspection to detect manufacturing defects or other issues. Moreover, the faster the inspection line moves, even more items can be inspected during a given time period. Thus, in this example, if a very high resolution is needed for a fast moving assembly line such as one that processes tens, hundreds or thousands of items per minute, the image sensors may employ a large array of image pixels. By way of example only, an array may have X thousand rows and Y thousand columns, which may be selected to maximize the number of pixels for a particular size of the image sensor. As noted above, if all other parameters remain unchanged, doubling the number of rows would result in the frame rate being halved. Thus, while the image resolution would double, the system would effectively operate at half the speed. This may be unacceptable for applications such as machine or prepared food inspections, or other industrial applications.

Example Pixel Array and Readout Assembly

Figure 3:
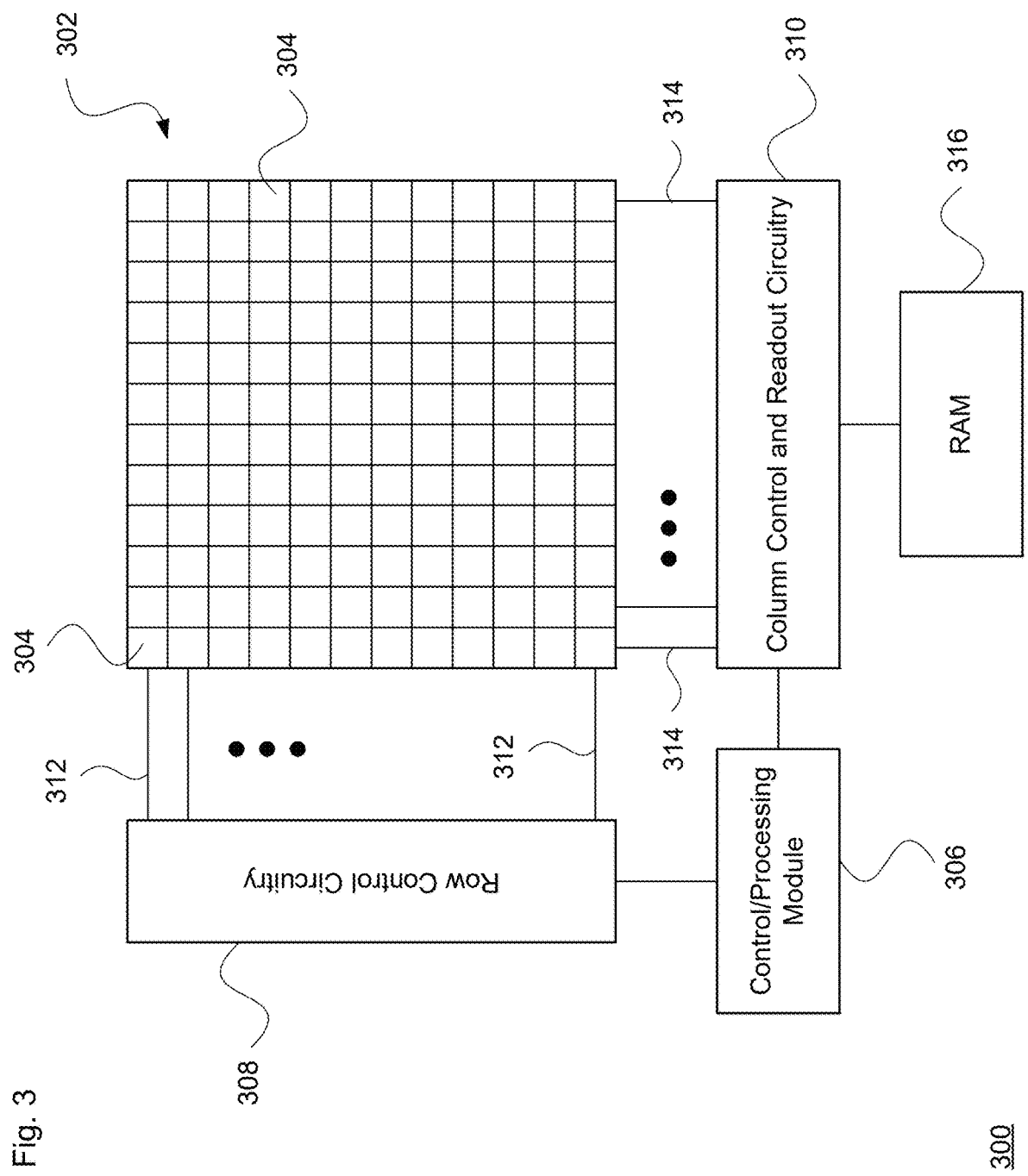
FIG. 3 is a block diagram of a pixel array and readout assembly for an image sensor in accordance with aspects of the technology.

FIG. 3 is a diagram of an illustrative configuration for a pixel array and readout assembly 300 for the image sensor 104 of FIG. 1. As shown in FIG. 3, the assembly 300 includes a pixel array 302 containing sensor pixels 304 arranged in rows and columns, along with control and processing circuitry in module 306. The array 302 may contain, for example, tens, hundreds, or thousands of rows and columns of sensor pixels 304. Module 306 may be coupled to row control circuitry 308 (sometimes referred to as row driver circuitry or pixel driver circuitry) and column control and readout circuitry 310 (sometimes referred to as column readout circuitry or column control circuitry, readout circuitry, or column decoder circuitry). Control module 306 may receive (row) addresses from row control circuitry 308 and supply corresponding (row) control signals such as reset, anti-blooming, row select (or pixel select), modulation, storage, charge transfer, readout, sample-and-hold, and/or store control signals to pixels 304 over (row) control paths 312.

One or more lines such as column lines 314 may be coupled to each column of pixels 304 in array 302. Column lines 314 may be used for reading out image signals from pixels 304 and for supplying bias signals (e.g., bias currents or bias voltages) to pixels 304. The column control and readout circuitry 310 may receive image signals (e.g., analog pixel values generated by pixels 304) over lines 314. This circuitry 310 may include memory circuitry for storing calibration signals (e.g., reset level signals, reference level signals) and/or image signals (e.g., image level signals) read out from the array 302, amplifier circuitry or a multiplier circuit, analog to digital conversion (ADC) circuitry, bias circuitry, latch circuitry for selectively enabling or disabling the portions (columns) of the circuitry 310, or other circuitry that is coupled to one or more pixels in array 302 for operating pixels 304 and for reading out image signals from pixels 304. ADC circuitry in the circuitry 310 may convert analog pixel values received from array 302 into corresponding digital pixel values (sometimes referred to as digital image data or digital pixel data). The circuitry 310 may supply digital pixel data to control/processing module 306 for pixels 304 (e.g., in one or more pixel columns).

The pixel array 302 may also be provided with a filter array having multiple (color) filter elements each corresponding to a respective pixel, which allows a single image sensor to sample light of different colors or sets of wavelengths. In general, filter elements of any desired color and/or wavelength (e.g., optical or infrared wavelengths) and in any desired pattern may be formed over any desired number of image pixels 304. By way of example, for time-of-flight sensing using an illumination source (e.g., in illumination module 110 in FIG. 1), the pixel array 302 may be provided with a correspond filter array that passes light having colors and/or frequencies emitted from the illumination source.

In accordance with aspects of the technology, a set of RAM (buffer memories) 316 may be coupled to the column control and readout circuitry 310. As shown, RAM 316 is coupled to the column control and readout circuitry 310. As discussed further below, the RAM 316 is employed when performing parallel row readout.

The image sensors 104 of camera module 102 (FIG. 1) may include one or more arrays 302 of image pixels 304. The image pixels 304 may be formed in a semiconductor substrate using complementary metal-oxide-semiconductor (CMOS) technology, charge-coupled device (CCD) technology, or any other suitable photosensitive device technology. Image pixels 304 may be frontside illumination (FSI) image pixels or backside illumination (BSI) image pixels. Moreover, the array 302 may include pixels 304 of different types such as active pixels, optically shielded pixels, reference pixels, etc. If desired, the image sensor(s) may include an integrated circuit package or other structure in which multiple integrated circuit substrate layers (e.g., from multiple wafers) or chips are vertically stacked or otherwise arranged with respect to each other.

Figure 4:
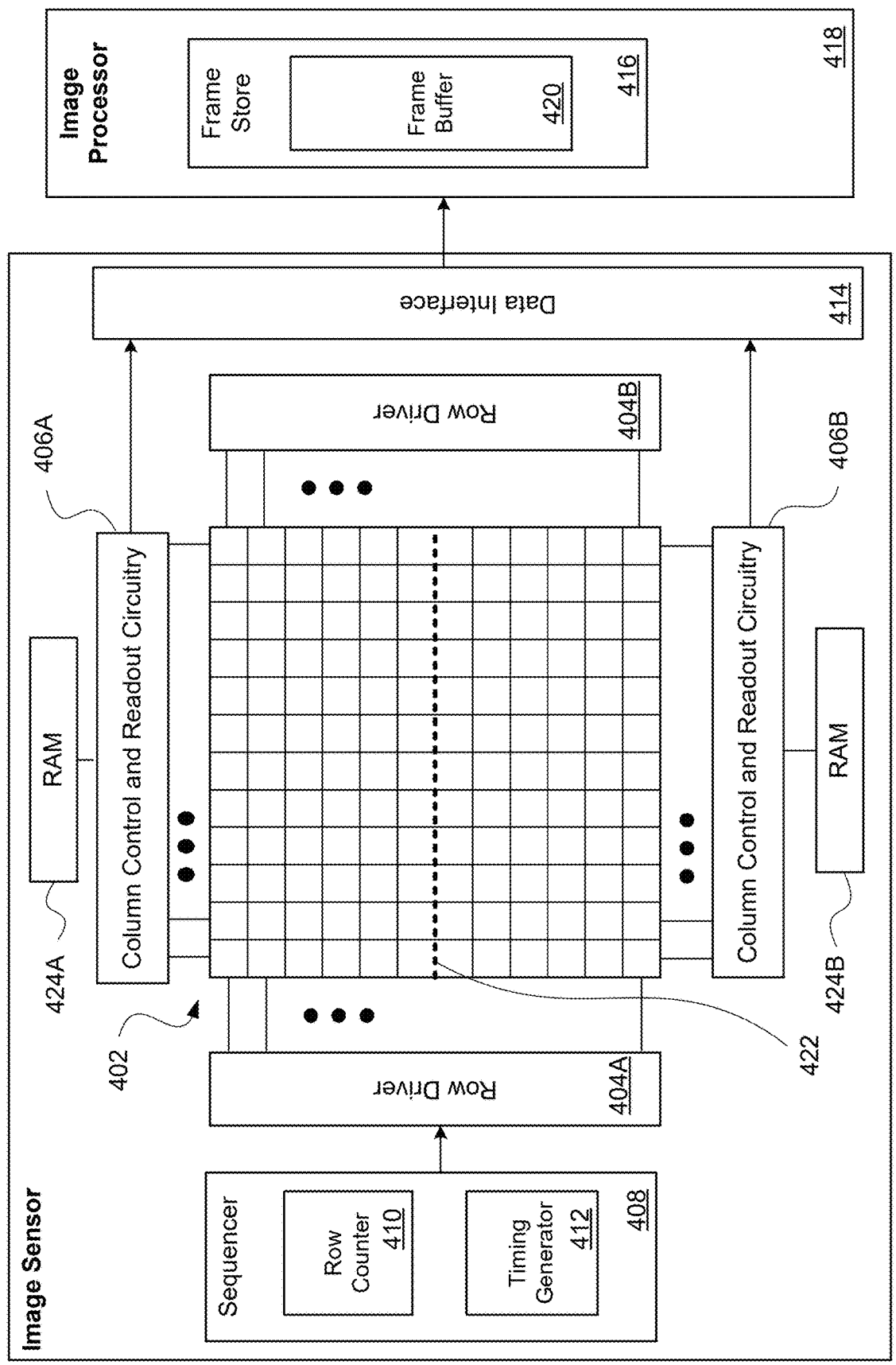
FIG. 4 is a block diagram of a segmented image array and readout assembly for an image sensor in accordance with aspects of the technology.

An illustrative image sensor 400 having a segmented image array is presented in FIG. 4. As shown, pixel array 402 may be coupled to row driver circuitry 404A and 404B and to column control and readout circuitry 406A and 406B (sometimes referred to as column readout circuitry or column control circuitry, readout circuitry, or column decoder circuitry). Pixels of the array 402 may generate charge in response to incident light. In a global shutter image sensor, all of the pixels may generate charge and transfer the charge to storage nodes simultaneously. Row drivers 404A and 404B may address a row of pixels to read out the charge associated with that row over column readout circuitry 406A and 406B. Sequencer 408 may be coupled to row driver circuitry 404A and 404B, and may include a row counter 410 and a timing generator 412.

Row counter 410 may determine which row of array 402 should be addressed and read out over column readout circuitry 406A or 406B. Timing generator 412 may time the signals provided by sequencer 408 to row driver circuitry 404A and 404B. In particular, timing generator 412 may vary the length of time for which a row of pixels is read out based on the distance of the row from column readout circuitry 406A or 406B. In particular, rows of pixels closer to column readout circuitry 406A may have a lower RC time constant, and therefore require less settling time, than rows of pixels further from column readout circuitry 406B. Therefore, the readout time for the rows closer to column readout circuitry 406A may be reduced relative to the readout time for the rows further from column readout circuitry 406B (e.g., the signals may be provided from timing generator 412 to row drivers 404A faster, thereby resulting in a faster readout). If desired, the readout times may be applied to groups of rows in the array 402. For example, groups of two rows, three rows, five rows, ten rows, more than five rows, fewer than 10 rows, or any other desired number of rows of pixels may all have the same readout timing. When timing generator 412 receives a row from row counter 410 that corresponds to the next group of rows, the readout time may be adjusted based on a look up table that provides for readout times based on the given row, for example. In this way, the frame rate of the image sensor may be reduced relative to reading out all of the rows of array 402 using the same readout times (e.g., a length of time to accommodate the settling time of the rows furthest from the column readout circuitry).

After being addressed by row driver circuitry 404A and 404B, the signals of a given row of pixels may be read out through column readout circuitry 406A and 406B and may then be fed through data interface 414. Data interface 414 may then pass the signals to a frame store 416 in image processor 418 (which may be part of image processing circuitry 108 of FIG. 1). Frame store 416 may include a frame buffer 420 that stores the signals produced by certain rows of pixels while other rows of pixels are being read out. The frame buffer 420 in frame store 416 may be collocated, thereby accounting for timing differences in reading out the rows of pixels. Alternatively, if the frame buffer 420 is not collocated, the signals from at least some of the rows of pixels may be passed through data interface 414 using the full bandwidth of the data interface, if desired. In this way, the signals that reach the frame buffer 420 may all be normalized (e.g., may all be data packets of the same size) when they reach the frame buffer 420. In either case, the frame buffer 420 in frame store 416 may account for the data from the rows of pixels arriving asynchronously. For example, the frame buffer may receive the data in packets and store blank data when not receiving any data. Processing circuitry in image processor 418 may then reconstruct the rows of data from the row data and blank data from the frame buffer.

The data produced by the pixel array 402 may be read out through column readout circuitry 406A and/or 406B in a variety of ways. First, each row may be completely read up or down (e.g., completely toward column readout circuitry 406A or toward column readout circuitry 406B). In this case, only one of column readout circuitry 406A or column readout circuitry 406B may be required. If the signals are read up (e.g., toward column readout circuitry 406A), the uppermost row of the array may have the shortest path to column readout circuitry 406A, thereby having the lowest RC time constant and requiring the least settling time. The lowermost row of the array may have the longest path to column readout circuitry 406A, thereby having the greatest RC time constant and requiring the most settling time. Therefore, timing generator 412 may drive row driver signals from row driver circuitry 404A and/or 404B at a faster rate for rows closer to the uppermost row than for rows closer to the lowermost row. For example, timing generator 412 may send the read row driver signals at a first rate for a first set of rows, a second rate that is slower than the first rate for a second of rows, etc. The sets of rows may be equal divisions of rows, such as each set including five rows, ten rows, more than ten rows, less than fifteen rows, or any other desired number of rows. Alternatively, the sets of rows may have different numbers of rows. If desired, the rate for each row of pixels may be stored in a look up table that is referenced by timing generator 412.

If the signals are read up toward column readout circuitry 406A, column readout circuitry 406B may be omitted. Additionally, although row driver circuitry 404A and 404B is shown on both sides of the array, this is merely illustrative. Row driver circuitry may be included on only one side of the array, if desired.

Moreover, although the image sensor has been described as reading the signals up toward column readout circuitry 406A, the signals may instead be read down toward column readout circuitry 406B. If desired, column readout circuitry 406A (or 406B) may be omitted. If the signals are read down (e.g., toward column readout circuitry 406B), the lowermost row of the array may have the shortest path to column readout circuitry 406B, thereby having the lowest RC time constant and requiring the least settling time. The uppermost row of the array may have the longest path to column readout circuitry 406B, thereby having the greatest RC time constant and requiring the most settling time. Therefore, timing generator 412 may drive row driver signals from row driver circuitry 404A and/or 404B at a faster rate for rows closer to the lowermost row than for rows closer to the uppermost row.

Array 402 may also include an optional cut 422 at the center of the array as shown by the dotted line. The cut 422 may allow for pixel rows above it to be read up toward column readout circuitry 406A and for pixels below it to be read down toward column readout circuitry 406B. If the cut 422 is included, the furthest rows from both column readout circuitry 406A and column readout circuitry 406B will be at the center of the array. Therefore, the central rows would have the highest RC time constant and require the longest settling time. Thus, the uppermost and lowermost rows (e.g., the rows closest to column readout circuitry 406A and column readout circuitry 406B, respectively) of pixels may be driven at the fastest rate, while the rows at the center of the array may be driven at the slowest rate. As the rows are read out through column readout circuitry 406A and 406B, the buffer 420 in frame store 416 may receive signals from multiple rows of pixels simultaneously. For example, the frame buffer 420 may receive the signals from the uppermost and lowermost rows of pixels simultaneously, and the signals from the central rows simultaneously. In this way, the frame rate of the image sensor may be further reduced by reading out multiple rows simultaneously with variable timing.

Additionally, instead of reading the rows above the cut 422 and below it in a mirrored fashion as previously described (i.e., reading the uppermost and lowermost rows of the array simultaneously first and reading the central rows simultaneously last), the closest row to one of column readout circuitry 406A and 406B may be read at the same time as a row closest to the cut 422. For example, if the uppermost row of the array is read out first, the row closest to the cut on the bottom half of the array may be read simultaneously (i.e., the row closest to the cut on the bottom half of the array may be driven to be read out at the same time as the uppermost row of the array).

Each successive row below the uppermost row may be read out with each successive row below the row closest to cut 422 on the bottom half of the array, until the row closest to cut 422 on the top half of the array is read simultaneously with the lowermost row of the array (i.e., the lowermost row of the array may be driven to be read out while the row closest to cut 422 is being read out). However, the opposite arrangement may also be used, where if the lowermost row of the array is read out first, the row closest to cut 422 on the top half of array 402 may be read simultaneously. Each successive row above the lowermost row may be read out simultaneously with each successive row above the row closest to cut 422 on the top half of the array, until the row closest to cut 422 on the bottom half of the array is read simultaneously with the uppermost row of the array.

In this scheme, the rows closest to column readout circuitry 406A and 406B will still be read faster than the rows closest to cut 422. Therefore, the timing will be asynchronous (e.g., a fast row will be read at the same time as a slow row). To account for this difference in timing, sequencer 408 may generate read row drive signals for multiple fast rows while the slow rows are being read out. For example, the first three fast rows may be read out at the same time as the first slow row. However, this is merely illustrative. In general, any number of rows may be read out concurrently with a slower row.

The bandwidth of data interface 414 may be distributed proportionally between the top and bottom portions of the array depending on the speed of the row being read out. For example, the rows read out at a faster speed may require higher bandwidth, and the rows read out a slower speed may require less bandwidth. To account for these differences, data interface 414 may divide the bandwidth using time domain multiplexing (TDM). In this way, data interface 414 may pass asynchronous signals from rows read out at different rates to frame store 416.

Frame store 416 may account for the asynchronous signals while storing the data generated by the pixels. For example, the frame buffer 420 in frame store 416 may receive the data in packets and store blank data when not receiving any data. Processing circuitry in image processor 418 may then reconstruct the rows of data from the row data and blank data from the frame buffer.

In accordance with aspects of the technology, one or more sets of RAM (buffer memories) 424 may be coupled to the column control and readout circuitry 406. As shown in this example, RAM 424A is coupled to the column control and readout circuitry 406A, while RAM 424B is coupled to the column control and readout circuitry 406B. As can be seen, the RAM is distinct from the storage in the image processor 418 (e.g., frame buffer 420 and frame store 416).

With this configuration, the sequencer 408 may be used to sequence triggering of row operations with analog to digital conversions, and transferring of rows into the RAM/buffer memories 424 and/or into the data paths for readout and deserialization. By way of example, the sequencer may operate as a line state machine, controlling ADC for every line as well as controlling the column memories. Note that when reading multiple lines at one time, this may still be one collective line read. In one scenario, a lookup table may be employed by the sequencer, where the lookup table lays out what happens in each clock cycle. Alternatively, in another scenario, the sequencer may employ a calculated sequence for each clock cycle.

Common Floating Diffusion

Figure 5:
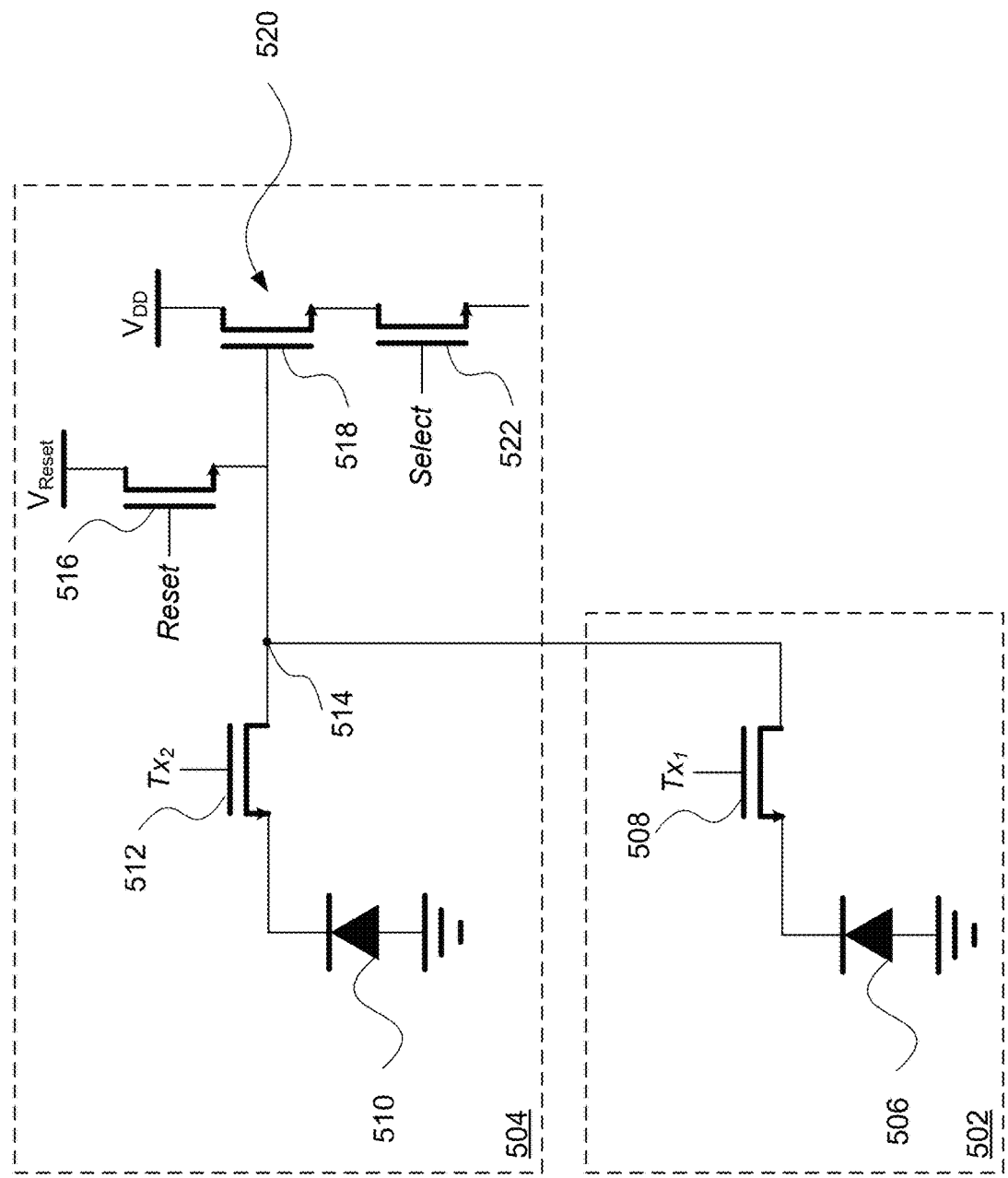
FIG. 5 illustrates an example multi-row pixel kernel with shared floating diffusion.

As noted above, parallel readout in accordance with aspects of the technology can be performed on two or more non-contiguous rows of pixels. This can be done both when subsampling and when two contiguous rows share a floating diffusion region. FIG. 5 illustrates an example pixel kernel 500 of shared floating diffusion for contiguous pixels in adjacent rows. This example shows a 1×2 pixel kernel with common floating diffusion for two vertically associated odd and even row pixels. In particular, there is a first pixel element 502 and a second pixel element 504. The first pixel element 502 includes a first photodiode 506 and a transistor 508 configured to apply a $Tx_1$ signal. The second pixel element 504 includes a second photodiode 510 and a transistor 512 that is also configured to apply a $Tx_2$ signal. The first and/or second photodiodes may be pinned photodiodes. Both transistors 508 and 512 are coupled to floating diffusion shown as node 514. Also coupled to floating diffusion at node 514 is transistor 516, which is tied to a reset voltage source ($V_{Reset}$) and is configured to apply a Reset signal. Transistor 518, which is also tied to the floating diffusion (node 514), provides a source-follower output 520 for readout of the charge from the pixel elements. Transistor 522, which is configured to apply a Select signal, is tied to transistor 518.

In this configuration, when control signals $Tx_1$ and $Tx_2$ are applied, they control both a flow of charge across the channel of the respective transistor 508 or 512, and a flow of charge into the floating diffusion region of node 514. When control signal $Tx_1$ or $Tx_2$ is asserted, image signals stored in either the photodiode 506 or 510, respectively, are able to pass through the channel region of the respective transistor 508 or 512 and into the floating diffusion region. The photodiode 506 and/or 510 may be reset to a supply voltage using the Reset control signal applied to the transistor 516, when the respective control signal $Tx_1$ and/or $Tx_2$ is also asserted. Alternatively, a dedicated reset transistor associated with each photodiode may be employed, such as a dedicated transistor whose source is connected to the photodiode and drain to $V_{DD}$. In this alternative, the photodiode would be reset by turning the dedicated transistor on.

The pixel kernel in this example has readout circuitry that includes the source follower transistor 518 and row select transistor 522. Transistor 522 may have a gate that is controlled by row select control signal Select. When the control signal Select is asserted, the transistor 522 is turned on and a corresponding output signal (e.g., an output signal having a magnitude that is proportional to the amount of charge at the floating diffusion region of the node 514) is passed onto a column readout path or bus line (not shown).

The transistor 516 couples floating diffusion node 514 to a reset supply voltage ($V_{Reset}$) that may the same as or different from the supply voltage $V_{DD}$. When control signal Reset is asserted, the transistor 516 is turned on. Thus, floating diffusion can reset to the desired supply voltage level.

Using the arrangement in FIG. 5, in order to double the frame rate it may be desirable to read rows N and N+2 in parallel—in other words to read near adjacent rather than adjacent rows in parallel. Each row is read and passed to the column memory. For reordering, the system needs to pass information from column memory into local storage, e.g., a set of RAM such as RAM 316 of FIG. 3, or RAM 424A and/or 424B of FIG. 4. Moreover, the parallel rows will be serialised upon readout so that further processing of the row data occurs serially for each row.

In existing approaches, in order to read N rows in parallel, 2×N row memories would be required to deinterleave the rows readouts. In other words, if 2 rows were read in parallel, then at least 4 memory rows would be required to deinterleave to a serial stream. And if 3 rows were to be read in parallel, then at least 6 memory rows would be required. In contrast, the approach discussed herein employs fewer row memories to achieve the desired readout.

Figure 6A:
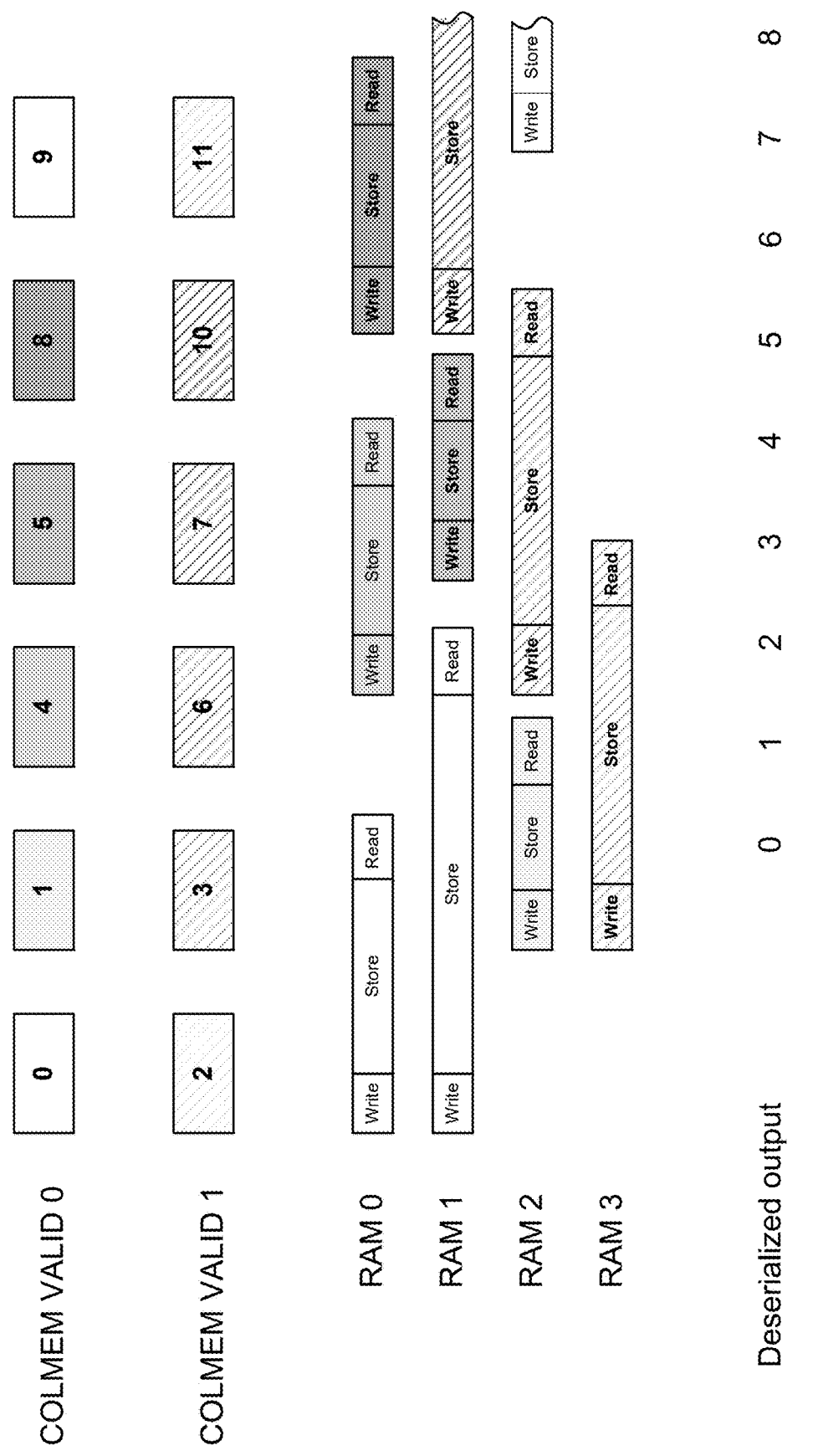
FIGS. 6A-6B illustrate examples of parallel row reads in which additional memories are required to buffer during pixel readout and processing.
Figure 6B:
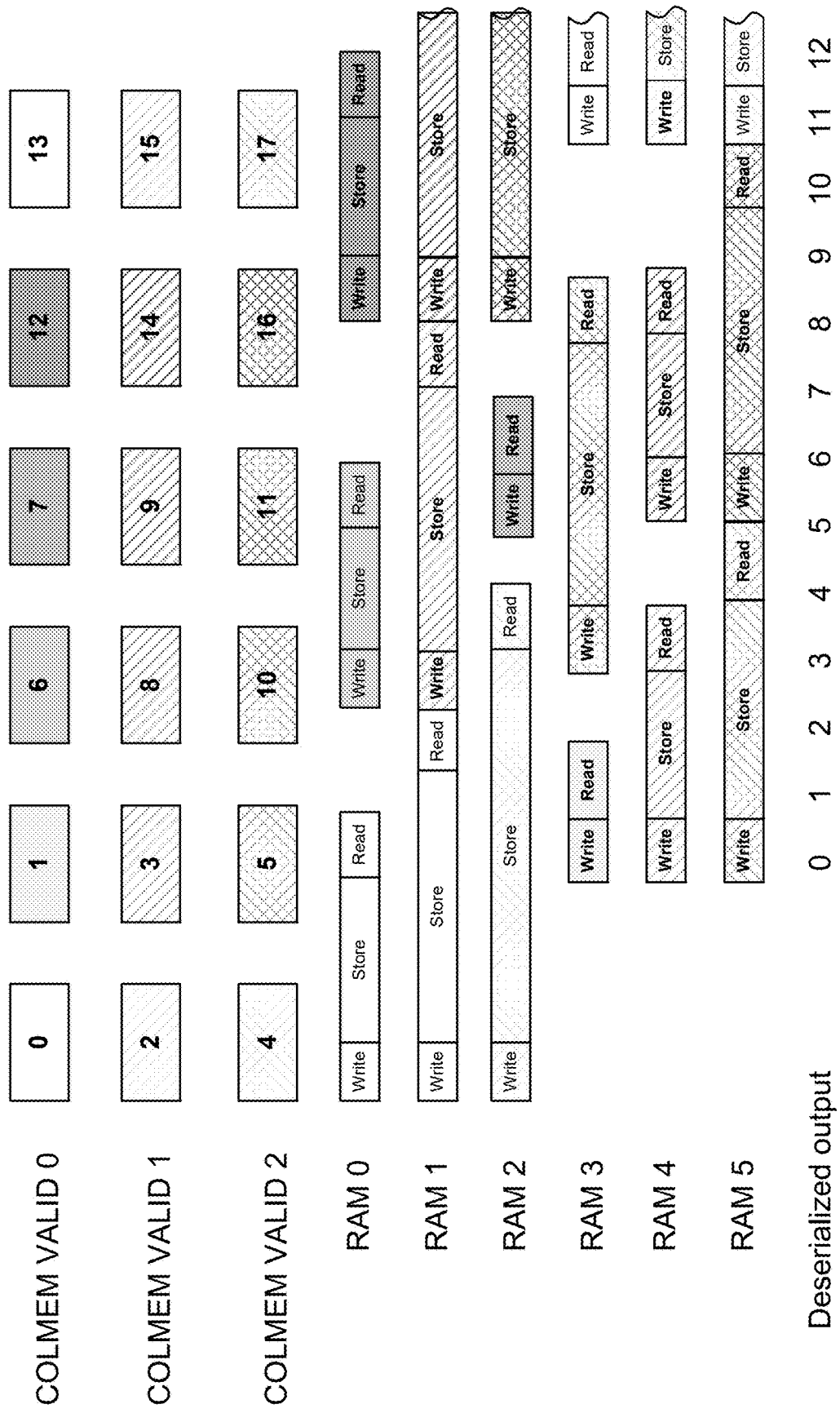

Examples of the additional memory rows are shown in FIGS. 6A-6B. In particular, the example 600 of FIG. 6A shows a situation where there are two parallel row reads from column memory ("COLMEM"). COLMEM may be disposed within an image sensor read path (e.g., as part of the column control and readout circuitry), interfacing between analogue and digital functions. The analogue section contains an ADC that converts the analogue signal to digital domain and the COLMEM stores this for further processing in the digital domain. In this figure, "valid 0" refers to the time period when the data contained in COLMEM row 0 is valid (is correct). Similarly, "valid 1" refers to the time period when the data contained in COLMEM row 1 is valid (is correct). Here, two rows are read in parallel for a sensor array having shared floating diffusion between even and odd rows. In particular, rows 0 and 2 are read in parallel and then rows 1 and 3, where because of the shared floating diffusion, 0 and 1 cannot be read in parallel, and 2 and 3 cannot be read in parallel. All COLMEM rows are buffered through a row memory to support a sequential row stream at twice the COLMEM row read rate. Thus, as shown, four buffering memories (here, RAM 0, RAM 1, RAM 2, and RAM 3) are required to allow two rows to be written while two rows are read from memory. The write, store, and read states of each memory are shown in relation to the timing for each pair of rows (e.g., 0 and 2, 1 and 3, 4 and 6, 5 and 7, 8 and 10, 9 and 11, etc.), with the corresponding deserialized output shown at the bottom of the figure. In the example 600 of FIG. 6A, all COLMEM rows are buffered through a row memory to support a sequential row stream at twice the COLMEM row read rate. As illustrated, horizontal direction is effectively time. Write and read are same duration for each row read. Store duration, however, varies by an amount required to reorder the input rows to the correct output row sequence.

Similarly, example 650 of FIG. 6B shows a situation where there are three parallel row reads for a sensor array having shared floating diffusion between even and odd rows, for instance with rows 0, 2, and 3 read in parallel and then rows 1, 3, and 5 read in parallel. As with example 600 of FIG. 6A, here all COLMEM rows are buffered through a row memory to support a sequential row stream at three times the COLMEM row read rate. Thus, as shown, six buffering memories (here, RAM 0, RAM 1, RAM 2, RAM 3, RAM 4, RAM 5, and RAM 6) are required to allow three rows to be written while three rows are read from memory. The write, store, and read states of each memory are shown in relation to the timing for each triplet of rows (e.g., 0,2,4; 1,3,5; 6,8,10; 7,9,11; 12,14,16; 13,15,17, 18,20,22, etc.), with the corresponding deserialized output shown at the bottom of the figure. As noted above with regard to FIG. 6A, store duration varies by an amount required to reorder the input rows to the correct output row sequence.

As seen from these examples with 4 and 6 buffer memories, respectively, such an approach can be both inefficient and costly, both in terms of component cost and computational cost.

Example Deserialization Scenarios

In contrast to the above approach that requires numerous additional buffer memories, the following explains a deinterleaving configuration and approach that minimizes the number of buffer memories and does not utilize a separate frame buffer as in FIG. 4. The following method applies to both contiguous and noncontiguous parallel row reads. There are two stages of deinterleaving multiple rows that are read in parallel. A first stage is the read process, and a second stage is the storage process.

Figure 7B:
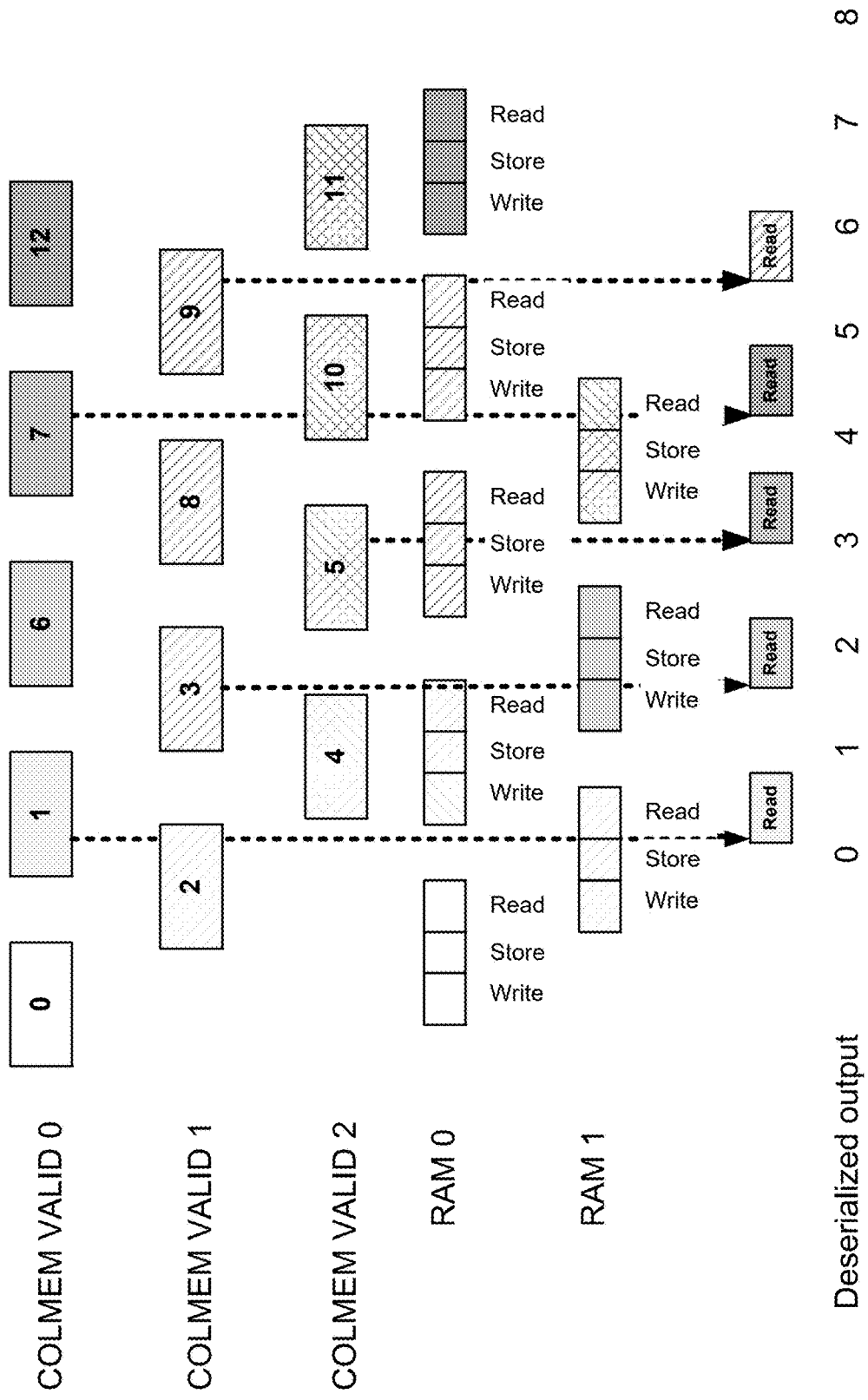

Example 700 of FIG. 7A shows an approach when performing two parallel row reads. Example 720 of FIG. 7B shows an approach when performing three parallel row reads. And example 740 of FIG. 7C shows an approach when performing four parallel row reads. Although only 2, 3 and 4 parallel row read examples are presented, the method can be extended to any number of parallel row reads.

In particular, as illustrated in FIGS. 7A-7C, the first read process stage includes performing a TDM (time division multiplex)-based partial deinterleaving when reading rows, and the second storage process stage includes deinterleaving using a memory store (e.g., RAM) to time shift at least some of the rows to achieve partial deinterleaving. By way of example, the system could multiplex in units on the order of 1 usec, or more or less. As shown, rows are read in a TDM manner, in which each row can be read with a time delay Ta equal or otherwise corresponding to:

$$T_d = \frac{\text{twice the deinterleaved row time}}{\text{number of rows read in parallel}}$$

This orders even rows sequentially and odd rows sequentially. "VALID" indicates a period for which the information in COLMEM 0 or COLMEM 1 is valid. The even rows are time-shifted by the same amount of time $T_d$, which deinterleaves the independently sequential odd and even rows into a fully sequential row stream at the deinterleaved row time.

In the example 700 shown in FIG. 7A, row 0 is read to COLMEM 0 and the data is valid for the period shown. Row 0 data is then read to RAM 0 and read out from RAM 0. After writing to RAM 0, row 1 and row 2 are read to COLMEM 0 and COLMEM 1, respectively, where again information is valid for the period shown. Row 1 data is then directly read from COLMEM 0 during a period of valid/2 later than row 0. At the same time as reading COLMEM 0 directly, COLMEM 1 content corresponding to row 2 is transferred to RAM 0, and the content of RAM 0 is then read a period of valid/2 later.

This process is repeated for subsequent odd and even rows. The odd rows are not passed to local storage (here, RAM 0), but rather are read out directly to the output. The odd rows are therefore not time-shifted. The result at the output is a sequential readout of the rows. This approach holds for any number of parallel lines, as shown in FIG. 7B (3 parallel lines) and 7C (4 parallel lines), provided that the read period is shorter than the deserialized line time. Note that in the example of FIG. 7A, the duration of storage in RAM 0 is illustrated as shorter than the duration of storage in the example of FIG. 7B or 7C, because, due to interleaving of readout, an additional RAM is not needed because the system can read directly from COLMEM. Note that while these examples have the even rows being read through memory while the odd rows are read directly from COLMEM, it is also possible to have the odd rows being read through memory while the even rows are read directly from COLMEM. This can depend on the relationship between row numbers and which pairs of rows share a floating diffusion.

It can be seen in the examples 700, 720 and 740 that N−1 memory rows are required to deserialize by this approach, where N is the number of rows being read in parallel. In contrast, the approach discussed in examples 600 and 650 requires 2N memory rows. The present approach would thus result in saving (N+1)/(2N) row memories. Thus, this approach enables a significant reduction in RAM/buffer memory requirements for deinterleaving parallel row read through multiple column paths, which benefits power area and yield, particularly considering larger array image sensors where the row length may be many thousands of pixels.

In FIG. 7B, here the sequencer may operate at ⅓ clocking when reading out rows, e.g., rows 0, 2, 1, 4, 3, 6 and 5, with, e.g., a 1 usec offset. In this example, each column memory would only be operating at a rate of 3 usec. However, by interleaving them, the system achieves an effective result of 1 usec. Writing from column memory into RAM can be achieved in under 1 usec. The system then holds (stores) the data in the RAM, and then subsequently reads from the RAM into the digital path. The result is a deserialized output as shown at the bottom of FIG. 7B.

Similarly, in FIG. 7C, the sequencer may operate at ¼ clocking when reading out the rows with, e.g., a 1 μsec offset. In this example, each column memory would only be operating at a rate of 4 μsec. However, by interleaving them, the system achieves an effective result of 1 μsec. Writing from column memory into RAM can be achieved in under 1 μsec. The system then holds (stores) the data in the RAM, and then subsequently reads from the RAM into the digital path. The result is a deserialized output as shown at the bottom of FIG. 7C.

Figure 8A:
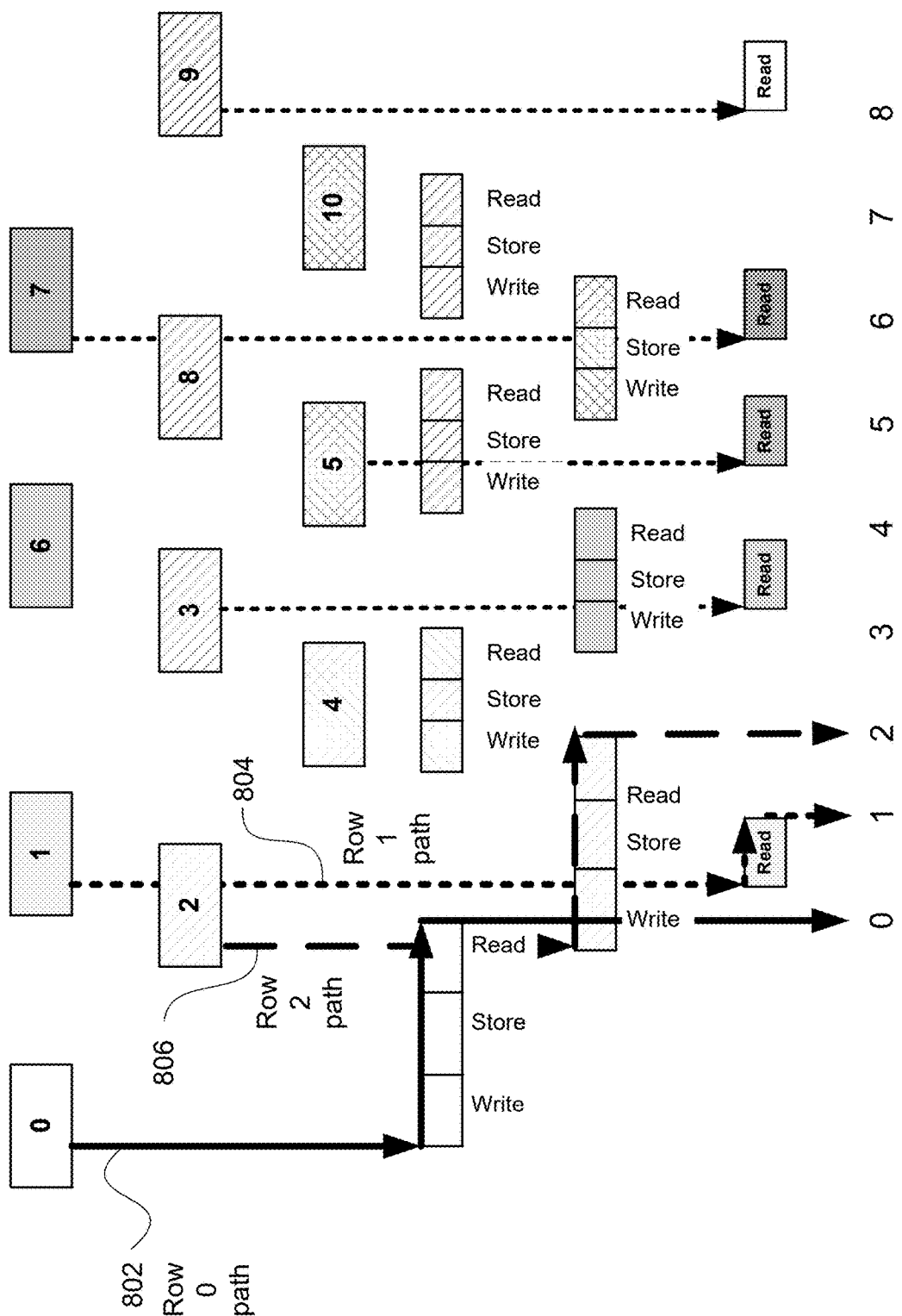
FIGS. 8A-8C illustrate different scenarios for a 3-parallel rows situation, in accordance with aspects of the technology.
Figure 8B:
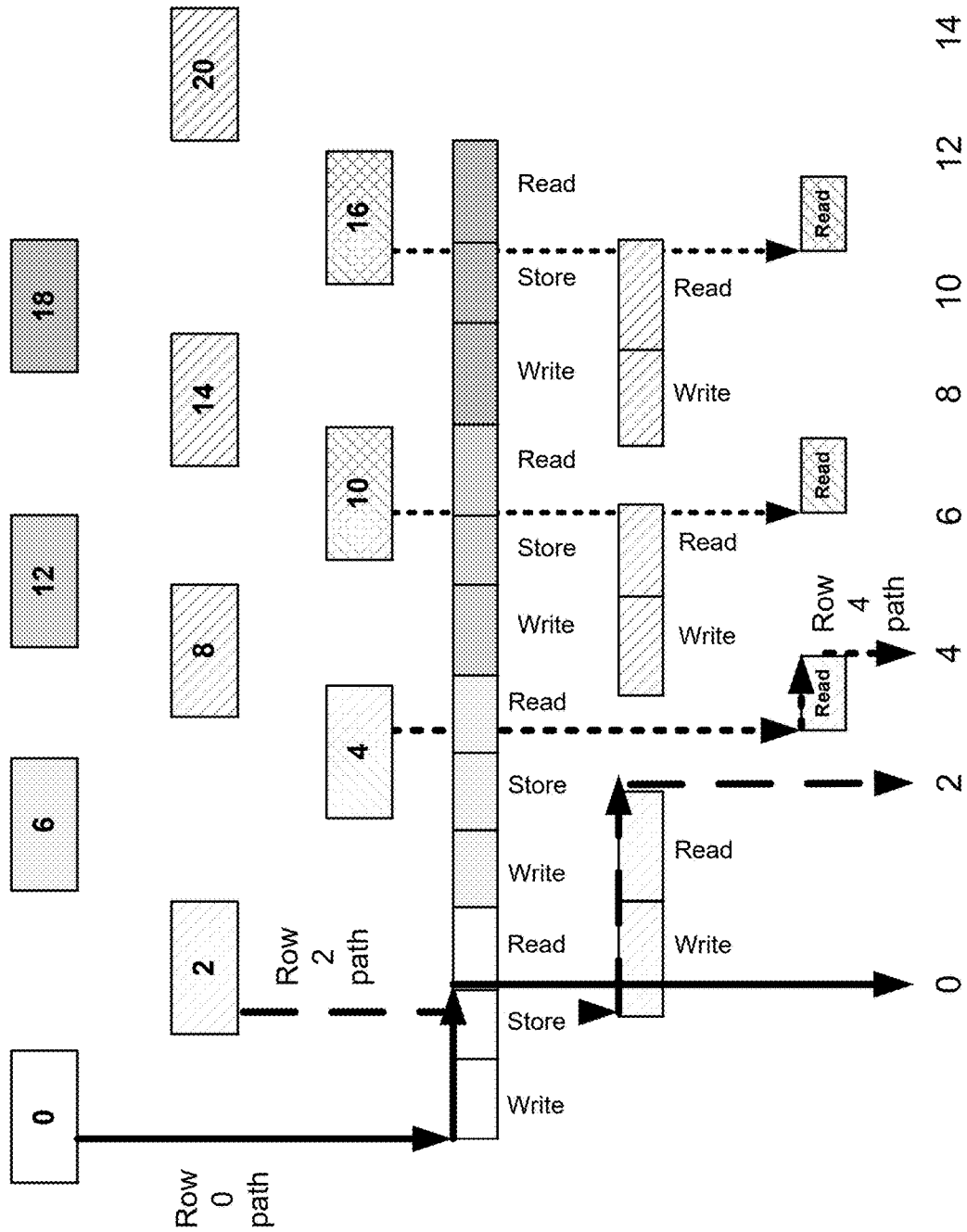
Figure 8C:
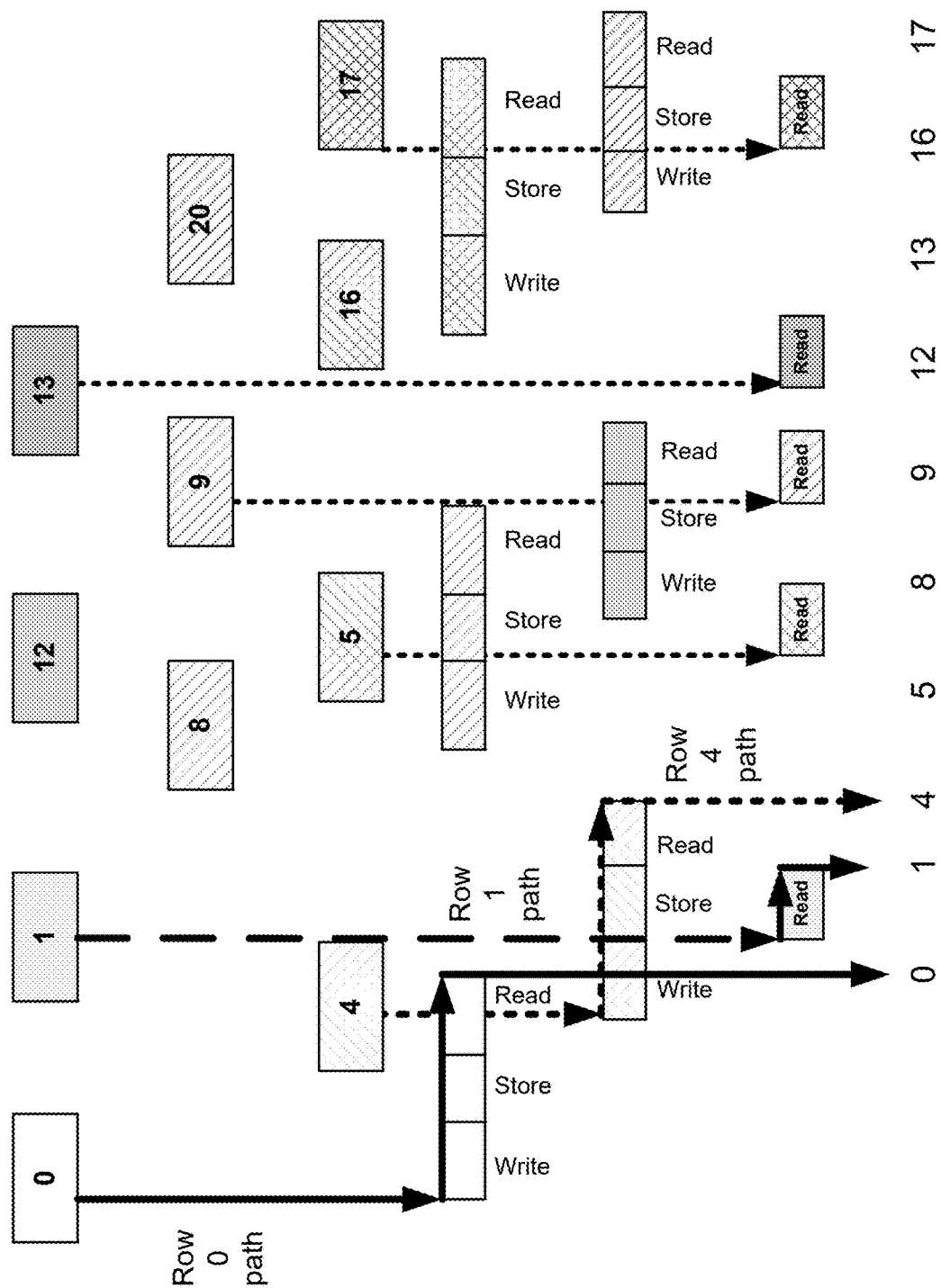

FIGS. 8A-8C illustrate three specific scenarios involving 3 parallel row reads, in particular a full-frame read (example 800 of FIG. 8A), monochromatic subsampling (example 820 of FIG. 8B), and color, or Bayer, subsampling (example 840 of FIG. 8C). When reading 3 or more rows in parallel, the switching of the rows is no longer synchronous so that power spikes may be smaller. This reduces requirements for power supply integrity, such as minimizing noise coupling to other sensitive parts of the image sensor through supply and ground routing.

In the full-frame read example 800, every row is read out, as shown by the three arrows for the row 0 path, the row 1 path and the row 2 path. The COLMEMs are not illustrated, but are employed as discussed above with regard to FIGS. 7A-C. By way of example, as with FIG. 7B, the sequencer in example 800 may operate at ⅓ clocking when reading out rows, e.g., rows 0, 2, 1, 4, 3, 6 and 5, with, e.g., a 1 μsec offset. In this example, each column memory would only be operating at a rate of 3 μsec. In the figure, the lengths of the write, store and read blocks are not necessarily to scale and are intended to illustrate how the resultant output is deserialized. Here, the paths for input parallel rows to serialised output flow are annotated to show clearly what the path for each row is. For example, row 0 would be read to COLMEM 0 and is written into, e.g., RAM 0 (see solid arrow 802 in FIG. 8A), then stored and subsequently read out to position 0 in the output sequence. Row 1, after being read to COLMEM 0, is read direct to position (see dotted arrow 804 in FIG. 8A) because write and store in RAM are bypassed to move row 1 forward in the sequence by 2 time units, so placing at position 1 in the output sequence. Similar to row 0, row 2 is read to COLMEM 1 and is then written into memory (e.g., RAM 1), where it is stored before being read out to position 2 in output sequence (see dashed arrow 806 in FIG. 8A). FIG. 8B shows a similar input row to output sequence flow for "read 1 skip 1", in which the output sequence is 0,2,4 6, etc. FIG. 8C shows the scenario for a "read 2 skip 2" sequence flow, where the output sequence is 0,1,4,5,8,9, etc.

By adjusting the sequencer timing, the system can support subsampling in both mono and Bayer, while maintaining the speed advantage of either approach (the tripling of the frame rate). In the monochromatic subsampling scenario shown in example 820, the system reads one row and skips the next row. Here, during the second level of deinterleaving, the second RAM may temporarily store information on the order of tens or hundreds of nanoseconds, which effectively results in a 2-line buffer. In particular, as shown in FIG. 8B, row 2 gets transferred into the second RAM, then is fed into the data stream so it is not stored by the second RAM. And row 4 is read directly into the data path (stream) without any transfer to RAM.

The color (Bayer) subsampling case as shown in example 840 of FIG. 8C involves reading rows 0.1 while skipping rows 2,3, then reading rows 4,5 while skipping rows 6,7, in other words reading two rows and then skipping two rows. The skipping is performed according to a row control signal (e.g., from row control circuitry or a sequencer). The signal flow in example 840 is otherwise similar to the full-frame read example 800.

Figure 9A:
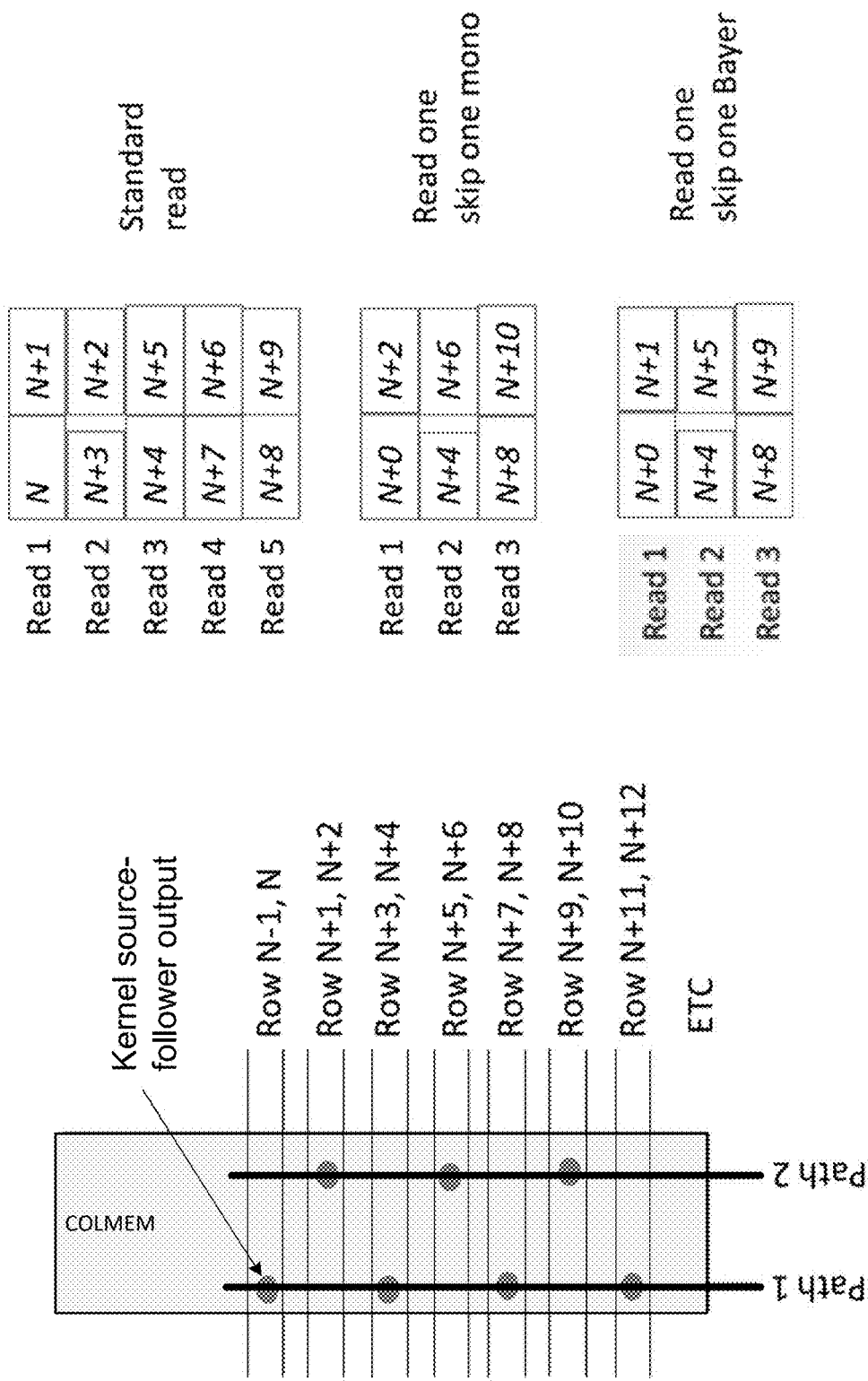
FIGS. 9A-9B illustrate different row read approaches in accordance with aspects of the technology.
Figure 9B:
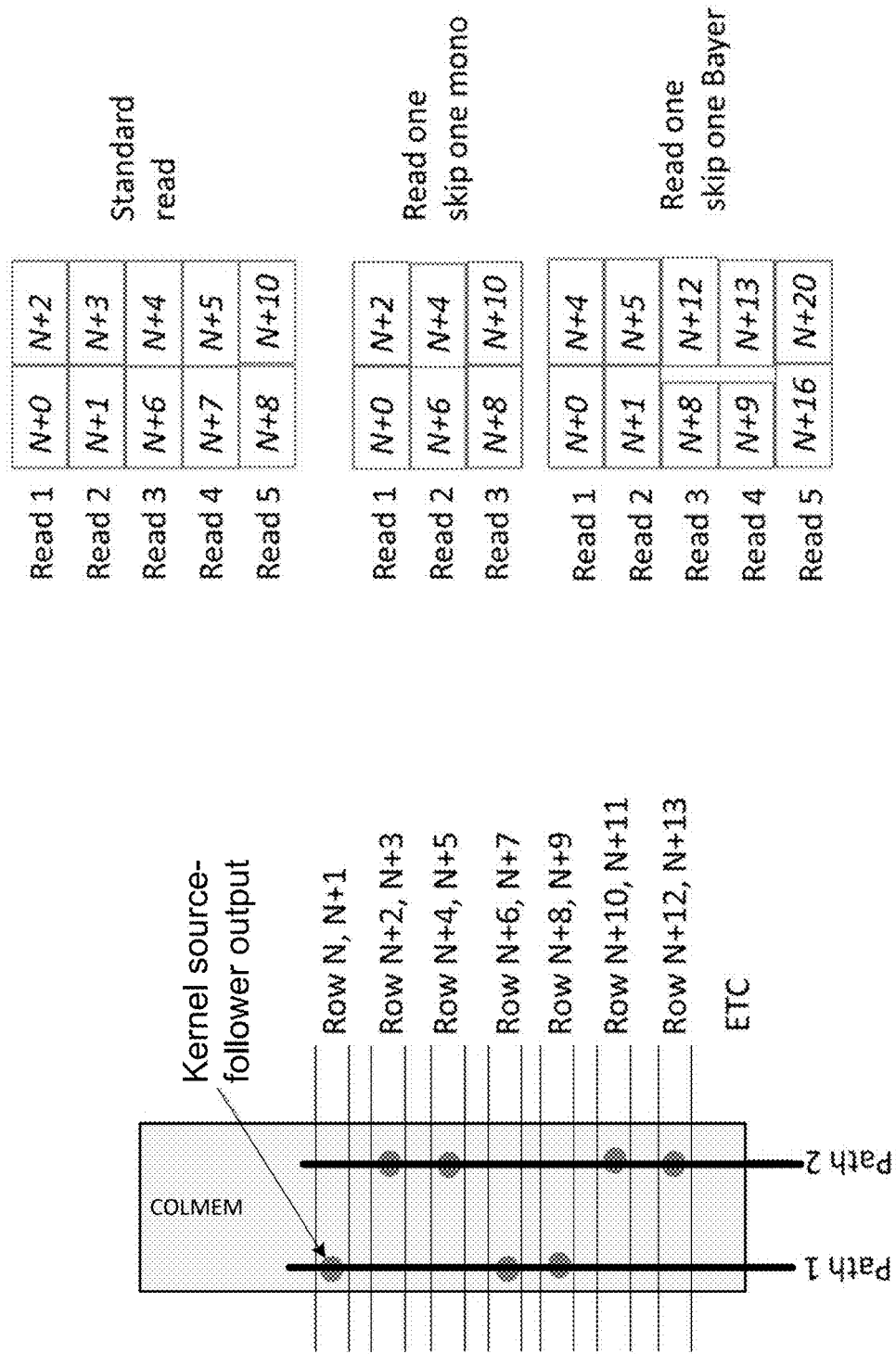

The method of interleaved row reading can be optimized to support different usage models, including a standard, full read, as well as mono and/or Bayer subsampling. FIGS. 9A-9B illustrate two example row reading strategies. Note that the optimum row interconnection is dependent on the total number of rows being read in parallel.

Example 900 of FIG. 9A illustrates a first row read approach when performing two parallel row reads. The left side of the figure illustrates two row paths associated with the column memories. Path 1 goes to a first column memory, while path 2 goes to a second column memory. The paths cannot be redirected to different column memories. The right side shows three different readout approaches for a standard (full) readout, a mono subsampling, and a Bayer subsampling.

Example 950 of FIG. 9B illustrates a second row read approach when performing two parallel row reads. As with example 900, the left side of this figure illustrates two row paths associated with the column memories. The right side shows three different readout approaches for a standard (full) readout, a mono subsampling, and a Bayer subsampling.

FIG. 10 illustrates a method 1000, which includes at block 1002 storing a captured image using a pixel array of an image sensor of an imaging system. The pixel array has a plurality of rows and a plurality of columns. At block 1004, the method also includes performing parallel row read deinterleaving of the stored image. This is done by (1) performing time division multiplexing partial deinterleaving of selected rows of the plurality of rows when reading the selected rows in parallel from the pixel array to order even rows of the selected rows sequentially and odd rows of the selected rows sequentially, as shown at block 1006; and (2) using a memory store to time-shift either the even rows or the odd rows of the partially deinterleaved selected rows, as shown at block 1008. The method also includes outputting, from the memory store, the time-shifted even rows or the odd rows as a deserialized output stream, as shown at block 1010.

In view of the above, it can be seen that aspects of the technology involve image sensors and imaging systems where it is necessary or desirable to read two or more non-contiguous rows in parallel, such as when two contiguous rows share a floating diffusion or when subsampling (e.g., mono or Bayer subsampling). Image sensors may have at least two column paths within each array column, associated with the two or more row reads. In this case, the at least two column paths may be connected to rows to support all row parallel readout and/or "read one, skip one"-type subsampling in both mono and color. Here, a column readout path may be associated with each of the at least two column paths.

A sequencer or other device in image sensor may be configured to independently generate row signals to achieve a first data reordering of odd and even rows independently. Here, the timing may be selected with an offset between near adjacent rows by twice the deinterleaved row time divided by the number of rows being read in parallel. The sequencer or other device may be configured to read from the memory at the deinterleaved row time with respect to the preceding row. In certain configurations, the sequencer or other device is configured to read to the output deinterleaved row stream alternate rows from retiming row memories and directly from the column readout path in order to output a serial row stream. Such a device may alternatively or additionally be configured to alternate which parallel row is stored in memory (e.g., RAM or other local memory).

Moreover, the above-described approaches enable the image sensor to employ at least one row memory less than the at least two rows being read in parallel.

Although the technology herein has been described with reference to particular embodiments/configurations, it is to be understood that these are merely illustrative of the principles and applications of the present technology. It is therefore to be understood that numerous modifications may be made to the illustrative embodiments and that other arrangements may be devised without departing from the spirit and scope of the present technology as defined by the appended claims. By way of example only, components that are illustrated as being arranged in series may have a complementary configuration in parallel; similarly, components that are illustrated as being arranged in parallel may have a complementary configuration in series.

The invention claimed is:

1. A method, comprising:
storing a captured image using a pixel array of an image sensor of an imaging system, the pixel array having a plurality of rows and a plurality of columns;
performing parallel row read deinterleaving of the stored image by:
performing time division multiplexing partial deinterleaving of selected rows of the plurality of rows when reading the selected rows in parallel from the pixel array to order even rows of the selected rows sequentially and odd rows of the selected rows sequentially; and
using a memory store to time-shift either the even rows or the odd rows of the partially deinterleaved selected rows; and
outputting, from the memory store, the time-shifted even rows or the odd rows as a deserialized output stream.

2. The method of claim 1, wherein the time division multiplexing partial deinterleaving causes each row to be read with a time delay (Ta) corresponding to twice a deinterleaved row time divided by a number of rows being read in parallel.

3. The method of claim 1, wherein the memory store employs N−1 memory rows to perform the deinterleaving to time shift the partially deinterleaved selected rows, where N is a number of rows read in parallel.

4. The method of claim 1, wherein sequencing of the time division multiplexing is performed using a sequencer of the image sensor.

5. The method of claim 4, further comprising controlling transfer of the even rows or the odd rows of the partially deinterleaved selected rows into the memory store via the sequencer.

6. The method of claim 5, wherein the sequencer employs a calculated sequence for each clock cycle.

7. The method of claim 5, wherein the sequencer employs a lookup table for each clock cycle.

8. The method of claim 1, wherein pairs of pixels of adjacent rows in the pixel array share a common floating diffusion region.

9. The method of claim 1, further comprising performing subsampling during the reading the selected rows in parallel to achieve monochromatic subsampling for the deserialized output.

10. The method of claim 1, further comprising performing subsampling during the reading the selected rows in parallel to achieve Bayer subsampling for the deserialized output stream.

11. The method of claim 1, wherein the deserialized output stream is output to an image processor of the imaging system.

12. An image sensor, comprising:
a pixel array configured to store a captured image, the pixel array having a plurality of rows and a plurality of columns;
readout circuitry configured to perform readout of charges for at least some pixels in the pixel array, the readout circuitry including a plurality of column memories; and
a memory store operatively connected to the plurality of column memories;

wherein the image sensor is configured to perform parallel row read deinterleaving of the stored image by:
  performance of reading out selected rows of the plurality of rows in parallel from the pixel array to the plurality of column memories with a time delay; and
  performance of passing a subset of the selected rows to the memory store to time-shift the subset of the selected rows; and
an interface configured to output an output stream from the plurality of column memories and the memory store, the output stream including rows from the selected rows and the time shifted rows.

13. The image sensor of claim 12, wherein the memory store employs N−1 memory rows for performance of the time shift of the subset of the selected rows, where N is a number of rows read in parallel.

14. The image sensor of claim 12, further comprising a sequencer configured to sequence the reading out of the selected rows.

15. The image sensor of claim 14, wherein the sequencer is further configured to control the passing of the subset of the selected rows from the plurality of column memories into the memory store.

16. The image sensor of claim 12, wherein the image sensor is further configured to perform subsampling during the reading out of the selected rows.

17. The image sensor of claim 12, wherein pairs of pixels of adjacent rows in the pixel array share a common floating diffusion region.

18. An imaging system comprising:
  a pixel array configured to store a captured image, the pixel array having a plurality of rows and a plurality of columns;
  readout circuitry configured to perform readout of charges for at least some pixels in the pixel array, the readout circuitry including a plurality of column memories configured to read out selected rows of the plurality of rows with a time delay;
  a memory store operatively connected to the plurality of column memories, the memory store being configured to time-shift a subset of the selected rows; and
  an interface configured to output an output stream from the plurality of column memories and the memory store, the output stream including rows from the selected rows and the time shifted rows.

19. The imaging system of claim 18, further comprising an image processor having a frame store, wherein:
  the memory store is distinct from the frame store of the image processor; and
  the frame store is configured to receive the output stream from the memory store via the interface.

20. The imaging system of claim 19, further comprising a sequencer configured to trigger:
  the readout of selected ones of the plurality of rows with the time delay; and
  a transfer of the subset of the selected rows from the plurality of column memories to the memory store.

* * * * *